United States Patent
Subramanian et al.

(10) Patent No.: US 12,327,167 B2
(45) Date of Patent: Jun. 10, 2025

(54) SYSTEM AND METHOD FOR MULTI-TYPE MEAN FIELD REINFORCEMENT MACHINE LEARNING

(71) Applicant: ROYAL BANK OF CANADA, Toronto (CA)

(72) Inventors: Sriram Ganapathi Subramanian, Waterloo (CA); Pascal Poupart, Waterloo (CA); Matthew Edmund Taylor, Edmonton (CA); Nidhi Hegde, Edmonton (CA)

(73) Assignee: ROYAL BANK OF CANADA, Montreal (CA)

( * ) Notice: Subject to any disclaimer, the term of this patent is extended or adjusted under 35 U.S.C. 154(b) by 654 days.

(21) Appl. No.: 16/804,593

(22) Filed: Feb. 28, 2020

(65) Prior Publication Data

US 2020/0279136 A1    Sep. 3, 2020

Related U.S. Application Data

(60) Provisional application No. 62/812,903, filed on Mar. 1, 2019.

(51) Int. Cl.

| | | |
|---|---|---|
| *G06N 3/006* | (2023.01) | |
| *G06F 18/20* | (2023.01) | |
| *G06F 18/214* | (2023.01) | |
| *G06F 18/23213* | (2023.01) | |
| *G06N 20/00* | (2019.01) | |
| *G06N 20/20* | (2019.01) | |

(52) U.S. Cl.
CPC ......... *G06N 3/006* (2013.01); *G06F 18/2148* (2023.01); *G06F 18/23213* (2023.01); *G06F 18/285* (2023.01); *G06N 20/00* (2019.01); *G06N 20/20* (2019.01)

(58) Field of Classification Search
CPC .. G06K 9/6257; G06K 9/6223; G06K 9/6227; G06N 20/20; G06N 20/00
USPC ......................................................... 706/12
See application file for complete search history.

(56) References Cited

U.S. PATENT DOCUMENTS

| | | | | |
|---|---|---|---|---|
| 2015/0370232 A1* | 12/2015 | Kohn | ................... | G05B 19/048 700/287 |
| 2016/0191554 A1* | 6/2016 | Kaminsky | ........... | H04L 63/1425 726/23 |
| 2019/0175100 A1* | 6/2019 | Etleb | ....................... | G01L 1/205 |

OTHER PUBLICATIONS

Yang et al., "Mean Field Multi-Agent Reinforcement Learning", Proceedings of the 35th International Conference on Machine Learning, PMLR 80:5571, 2018 (Year: 2018).*

* cited by examiner

*Primary Examiner* — Tsu-Chang Lee
(74) *Attorney, Agent, or Firm* — NORTON ROSE FULBRIGHT CANADA LLP

(57) ABSTRACT

A system for a machine reinforcement learning architecture for an environment with a plurality of agents includes: at least one memory and at least one processor configured to provide a multi-agent reinforcement learning architecture, the multi-agent reinforcement learning model based on a mean field Q function including multiple types of agents, wherein each type of agent has a corresponding mean field.

21 Claims, 15 Drawing Sheets

Algorithm 1 Multi Type Mean Field $Q$ Learning for known types
---
1: Initialize the number of types $M$ and total number of agents $N$.
2: Initialize the $Q$ functions (parameterised by weights) $Q_{\phi^j}$, $Q_{\phi^j_-}$ for all agents $j$.
3: Initialize the mean action for each type $\bar{a}^j_1, \bar{a}^j_2 \cdots \bar{a}^j_M$ for each agent $j \in 1, \cdots, N$
4: Initialize the total number of steps (T) and total number of episodes (E)
5: while Episode < E do
6:     while Step < T do
7:         while m = 1 ... M do
8:             For each agent $j$ take action $a^j$ from $Q_{\phi^j}$ according to Eq. 23 with the current mean action for each type $\bar{a}^j_1, \cdots, \bar{a}^j_M$ and the exploration rate $\beta$.
9:             For each agent $j$, compute the new mean action for each type $\bar{a}^j_1, \cdots, \bar{a}^j_M$ according to Eq. 22.
10:         end while
11:         Execute the joint action $a = [a^1, ..., a^N]$. Observe the rewards $r = [r^1, ... r^N]$ and the next state $s'$.
12:         Store $(s, a, r, s', \bar{a}_1, \cdots, \bar{a}_M)$ in replay buffer $D$, where $\bar{a}_i$ is the mean action for type $i$ in the neighbourhood. The $a$ captures all the $N$ agents.
13:     end while
14:     while $j$ = 1 to $N$ do
15:         Sample a minibatch of K experiences $(s, a, r, s', \bar{a}_1, \cdots, \bar{a}_M)$ from $D$.
16:         Sample action $a^j$ from $Q_{\phi^j}$ with $\bar{a}^j_i \leftarrow \bar{a}^j_i$ for each type $i$.
17:         Set $y^j = r^j + \gamma v^{MTMF}_{\phi^j_-}(s')$ according to Eq. 21.
18:         Update the Q network by minimizing the loss $L(\phi^j) = \frac{1}{K}\Sigma(y^j - Q_{\phi^j}(s^j, a^j, \bar{a}^j_1, ... \bar{a}^j_M))^2$
19:     end while
20:     Update the parameters of the target network for each agent $j$ with learning rate $\tau$: $\phi^j_- \leftarrow \tau\phi^j + (1-\tau)\phi^j_-$
21: end while

FIG. 7

Algorithm 2 Multi Type Mean Field $Q$ Learning for unknown types

1: Initialize the number of types $M$ and total number of agents $N$.
2: Initialize the $Q$ functions (parameterised by weights) $Q_{\phi^j}$, $Q_{\phi^j_-}$ for all agents $j$.
3: Initialize the mean action for each type $\bar{a}^j_1, \bar{a}^j_2 \cdots \bar{a}^j_M$ for each agent $j \in 1, \cdots, N$
4: Initialize the total number of steps (T) and total number of episodes (E)
5: Initialize every agent to a type at random. Initialize an array $A$ containing the previous action of all agents.
6: Maintain a buffer $B$ for storing the last $C$ actions of all agents. $C$ is determined by the conditions of the environment. Initialize all values to 0.
7: while Episode < E do
8:    while steps < T do
9:       while $m = 1 \cdots M$ do
10:          For each agent $j$ take action $a^j$ from $Q_{\phi^j}$ according to Eq. 23 with the current mean action for each type $\bar{a}^j_1, \cdots, \bar{a}^j_M$ and the exploration rate $\beta$.
11:          For each agent $j$, compute the new mean action for each type $\bar{a}^j_1, \cdots, \bar{a}^j_M$ according to Eq. 22.
12:       end while
13:       Execute the joint action $a = [a^1, ..., a^N]$. Observe the rewards $r = [r^1, ...r^N]$ and the next state $s'$.
14:       Store $(s, a, r, s', \bar{a_1}, \cdots, \bar{a_M})$ in replay buffer $D$, where $\bar{a_i}$ is the mean action for type $i$ in the neighbourhood. The a captures all the $N$ agents.
15:       Store each action $[a^1, ..., a^N]$ in the Array $A$. Update the Buffer $B$ with the last action taken by all agents.
16:       Perform a K means clustering on $B$ with the number of clusters equal to the number of types $M$.
17:       Reassign the agents to different types based on the cluster in K means.
18:    end while
19:    while $j = 1$ to $N$ do
20:       Sample a minibatch of K experiences $(s, a, r, s', \bar{a_1}, \cdots, \bar{a_M})$ from $D$.
21:       Sample action $a^j$ from $Q_{\phi^j}$ with $\bar{a}^j_i \leftarrow \bar{a}^j_i$ for each type $i$.
22:       Set $y^j = r^j + \gamma v^{MTMF}_{\phi^j_-}(s')$ according to Eq. 21.
23:       Update the Q network by minimizing the loss $L(\phi^j) = \frac{1}{k}\Sigma(y^j - Q_{\phi^j}(s^j, a^j, \bar{a}^j_1, ...\bar{a}^j_M))^2$
24:    end while
25:    Update the parameters of the target network for each agent $j$ with learning rate $\tau$: $\phi^j_- \leftarrow \tau\phi^j + (1-\tau)\phi^j_-$
26: end while

FIG. 8

SYSTEM AND METHOD FOR MULTI-TYPE MEAN FIELD REINFORCEMENT MACHINE LEARNING

CROSS-REFERENCE TO RELATED APPLICATIONS

This application claims priority from U.S. Provisional Patent Application No. 62/812,903 filed on Mar. 1, 2019, the entire contents of which are hereby incorporated by reference herein.

FIELD

Embodiments of the present disclosure generally relate to the field of machine learning, and more specifically, embodiments relate to devices, systems and methods for multi-agent reinforcement machine learning.

BACKGROUND

Multi-agent reinforcement learning (MARL) is a quickly growing field with lots of recent research pushing its boundaries. However, the approaches are generally not capable of scaling efficiently and hence MARL approaches do not work well in environments with many interacting agents [5].

Research advances in the field of MARL [2, 4] deal with only a limited number of agents and the proposed methods cannot be easily generalized to more complex scenarios with many agents.

SUMMARY

Some recent research has used the concept of mean field theory for enabling the use of MARL approaches to environments with many agents [12, 7]. The current approaches implemented for many agents require some strong assumptions about the game environment to perform adequately.

The important mean field approximation reduces a many agent problem into a simplified two agent problem where all the other competing agents are approximated as a single mean field. This mean field approximation, however, would be valid only for scenarios where all the agents in the environment can be considered similar to each other in objectives and abilities. Real world applications often have a set of agents that are diverse and therefore it is virtually impossible to aggregate them into a single mean field.

As described in various embodiments herein, an approach to multiple types to model agent diversity in the mean field approximation for many agent reinforcement learning is described, and implemented in systems, methods, and computer-readable media.

"Types", as used herein, can describe groupings applied to other agents in an environment in such a way that all members of a particular type play approximately similar strategies and have similar overall goals. A modelling agent can thus consider each type to be a distinct agent, which can be modelled separately.

Within each type, the mean field approximation may still be reasonable as the agents within one particular type are more related to each other than any other agent from different types. Thus, the many agent interaction can be effectively reduced to N agent interactions where N is the number of types.

Mean field approximately of types is more complex than the simple two agent interaction considered in alternate approaches and conveniently, can better approximate a real world dynamic environment.

Most real world applications for many agent reinforcement learning can be broadly classified into two categories. The first category involves applications including predefined types and the type of each agent is known a priori. Some common applications include games with multiple teams (such as quiz competitions), multiple party elections with coalitions, airline price analysis with multiple airlines forming an alliance beforehand, etc. These applications are denoted as "predefined known type scenarios".

The second category are applications that can involve a large number of agents, and the agents may have different policies due to differences in their rewards, actions or observations. Common examples are demand and supply scenarios, stock trading scenarios etc. In an example, one type of agents may be risk averse while another type may be risk seeking. These applications are denoted as "pre-defined unknown type scenarios", since there are no true underlying types as in the first category, or the type of each agent is fixed but unknown, and therefore a suitable type can be discovered and assigned through observations.

In some embodiments, an agent may have partial labelling, and have one or more groupings or types applied.

Another aspect of embodiments described herein is the notion of neighbourhood, since each individual agent may be impacted more by agents whose states are "closer" (according to some distance measure) to the state of an agent. For instance, in battle environments, nearby agents pose a greater threat than far away agents. In some embodiments, agents may work together or collaborate with other agents (for example, in a team) to determine types of other agents.

Using an open source test environment for many agent games, such as MAgents [18], the approach described in various embodiments can consider three testbeds that involve many strategic agents in the environment. Two of the testbeds may correspond to the known type, and the third may correspond to the unknown type.

In some embodiments, two different approaches are proposed for the known and unknown type scenarios. Experiments described herein demonstrate the performance of these approaches in comparison to previous approaches that assume a single type of agents in the testbeds.

In accordance with one aspect of the present disclosure, there is provided a system for a machine reinforcement learning architecture for an environment with a plurality of agents. The system includes: at least one memory and at least one processor configured to provide a multi-agent reinforcement learning architecture, the multi-agent reinforcement learning model based on a mean field Q function including multiple types of agents, wherein each type of agent has a corresponding mean field.

According to an aspect, there is provided a computer-implemented method for multi-agent reinforcement learning, the method comprising: for an agent of multiple agents in an environment, identifying other agents in a neighbourhood of the environment of the agent; classifying each of the other agents into a type of multiple types; determining a mean action for each of the multiple types; inputting a state of the agent, an action of the agent, and the mean action for each of the types to a Q function to predict a policy that maps states and actions to probable rewards; and recursively updating the Q function to obtain an optimal policy that maximizes expected cumulative rewards among possible policies.

In some embodiments, the Q function is based on:

$$Q_{t+1}^j(s,a^j,\bar{a}_1^j,\bar{a}_2^j,\ldots \bar{a}_M^j)=(1-\alpha)Q_t^j(s,a^j,\bar{a}_1^j,\bar{a}_2^j,\ldots \bar{a}_M^j)+\alpha[r^j+\gamma v_t^j(s')]$$

where $a^j$ is an action of agent j, $\bar{a}_i^j$ is a mean action of the neighbours of agent j belonging to type i, $r^j$ is a reward obtained, s and s' are old and new states respectively, $\alpha_t$ is a learning rate, and $v_t^j(s')$ is a value function for agent j at time t.

In some embodiments, the value function $v_t^j(s')$ for agent j at time t is given by:

$$v_t^j(s') = \sum_{a^j} \pi_t^j(a^j | s', \bar{a}_1^j, \ldots \bar{a}_M^j) \mathbb{E}_{a_i^{-j} \sim \pi_t^{-j}}[Q_t^j[s', a^j, \bar{a}_1^j, \ldots \bar{a}_M^j]].$$

In some embodiments, the mean actions of the neighbours of agent j belonging to type i are calculated using the relation:

$$\bar{a}_i^j = \frac{1}{N_i^j} \sum_k a_i^k, \, a_i^k \sim \pi_t^k(\cdot | s, \bar{a}_{1-}^k, \ldots, \bar{a}_{M-}^k)$$

where $\pi_t^k$ is a policy of agent k belonging to type i and $\bar{a}_{i-}^k$ represents a previous mean action for the neighbours of agent k belonging to type i.

In some embodiments, a Boltzmann policy for each agent j is $$\pi_t^j(a^j | s, \bar{a}_1^j, \ldots \bar{a}_M^j) = \frac{\exp(\beta Q_t^j(s, a^j, \bar{a}_1^j, \ldots, \bar{a}_M^j))}{\sum_{a^{j'} \in A^j} \exp(\beta Q_t^j(s, a^{j'}, \bar{a}_1^j, \ldots \bar{a}_M^j))}.$$

In some embodiments, the type of each of the other agents is defined.

In some embodiments, the type of each of the other agents is initially unknown.

In some embodiments, the method further comprises performing k-means clustering to approximate a type for the initially unknown types.

In some embodiments, the recursively updating is performed to converge to a fixed point within a bounded distance of a Nash equilibrium.

In some embodiments, the Q function is implemented as a neural network.

According to another aspect, there is provided a non-transitory computer readable medium comprising a computer readable memory storing computer executable instructions thereon that when executed by a computer cause the computer to perform a method as described herein.

According to a furhter aspect, there is provided a system for a machine reinforcement learning architecture for an environment with a plurality of agents, the system comprising: at least one memory and at least one processor configured to provide a multi-agent reinforcement learning architecture, the multi-agent reinforcement learning architecture based on a recursively-updated Q function including multiple types of agents, wherein each type of agent has a corresponding mean action.

In some embodiments, the at least one processor is further configured to train an agent to maximize expected cumulative rewards using the multi-agent reinforcement learning architecture.

In some embodiments, the Q function is based on:

$Q_{t+1}^j(s, a^j, \bar{a}_1^j, \bar{a}_2^j, \ldots \bar{a}_M^j) = (1-\alpha) Q_t^j(s, a^j, \bar{a}_1^j, \bar{a}_2^j, \ldots \bar{a}_M^j) + \alpha[r^j + \gamma v_t^j(s')]$ where $a^j$ of is an action of agent j, $\bar{a}_i^j$ is a mean action of the neighbours of agent j belonging to type i, $r^j$ is a reward obtained, s and s' are old and new states respectively, $\alpha_t$ is a learning rate, and $v_t^j(s')$ is a value function for agent j at time t.

In some embodiments, the value function $v_t^j(s')$ for agent j at time t is given by:

$$v_t^j(s') = \sum_{a^j} \pi_t^j(a^j | s', \bar{a}_1^j, \ldots \bar{a}_M^j) \mathbb{E}_{a_i^{-j} \sim \pi_t^{-j}}[Q_t^j[s', a^j, \bar{a}_1^j, \ldots \bar{a}_M^j]].$$

In some embodiments, the mean actions of the neighbours of agent j belonging to type i are calculated using the relation:

$$\bar{a}_i^j = \frac{1}{N_i^j} \sum_k a_i^k, \, a_i^k \sim \pi_t^k(\cdot | s, \bar{a}_{1-}^k, \ldots, \bar{a}_{M-}^k)$$

where $\pi_t^k$ is a policy of agent k belonging to type i and $\bar{a}_{i-}^k$ represents a previous mean action for the neighbours of agent k belonging to type i.

In some embodiments, a Boltzmann policy for each agent j is $$\pi_t^j(a^j | s, \bar{a}_1^j, \ldots \bar{a}_M^j) = \frac{\exp(\beta Q_t^j(s, a^j, \bar{a}_1^j, \ldots, \bar{a}_M^j))}{\sum_{a^{j'} \in A^j} \exp(\beta Q_t^j(s, a^{j'}, \bar{a}_1^j, \ldots \bar{a}_M^j))}.$$

In some embodiments, the multiple types of agents are defined.

In some embodiments, the multiple types of agents are initially unknown.

In some embodiments, the at least one processor is further configured to perform k-means clustering to approximate a type for the initially unknown types.

In some embodiments, the Q function is recursively-updated to converge to a fixed point within a bounded distance of a Nash equilibrium.

In some embodiments, the Q function is implemented as a neural network.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 7 illustrates high-level pseudo-code for multi type mean field Q learning for known types, according to an embodiment.

FIG. 8 illustrates high-level pseudo-code for multi type mean field Q learning for unknown types, according to an embodiment.

DETAILED DESCRIPTION

Figure 1A:
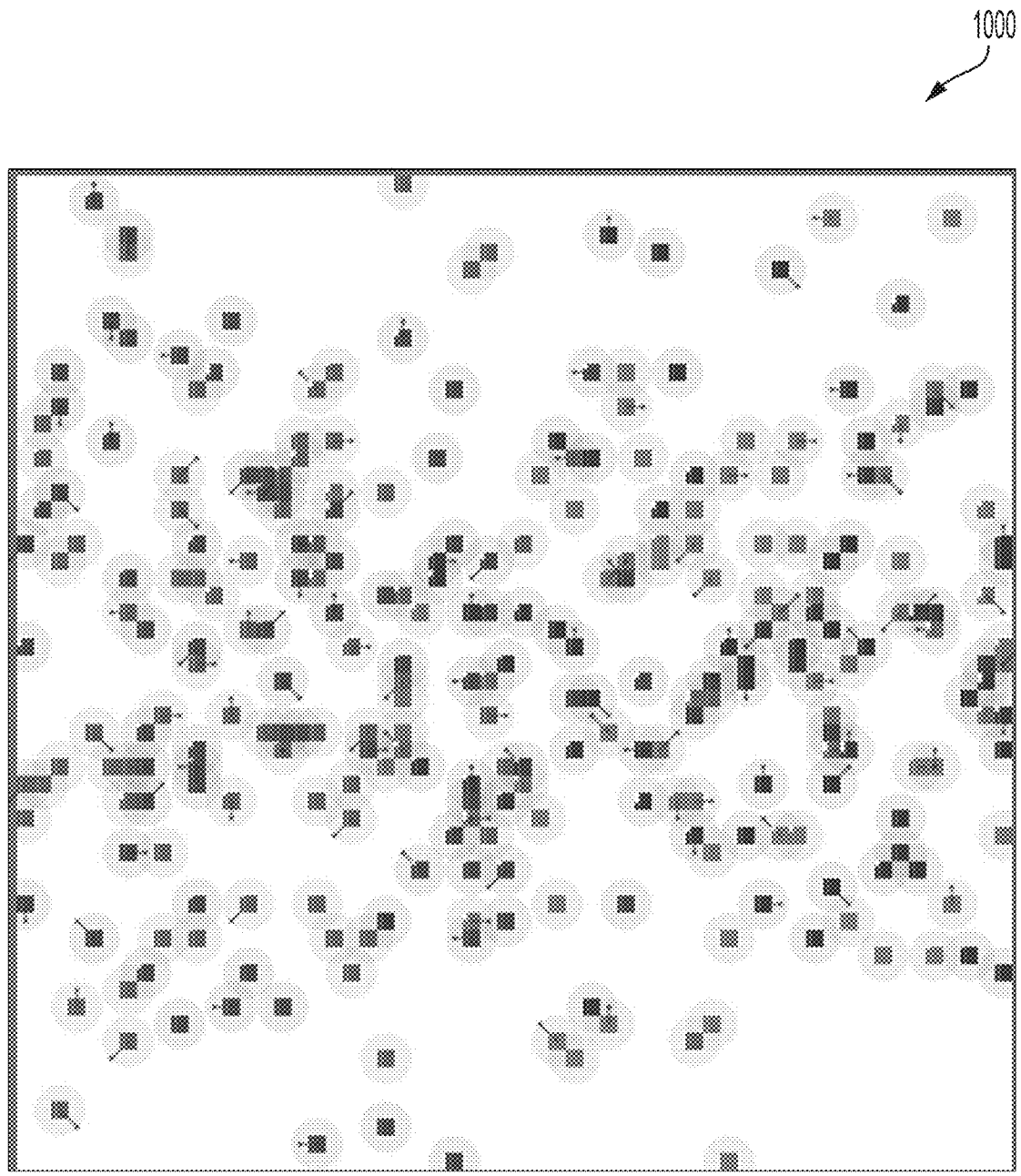
FIG. 1A shows aspects of an example multi-team battle environment.

Embodiments described herein are directed to systems, methods, and computer-readable media for multi-type mean field reinforcement machine learning. Multi-type mean field reinforcement machine learning is related to game theory.

Mean field theory has been integrated with the field of multiagent reinforcement learning to enable multiagent approaches to scale to a large number of interacting agents in the environment.

In various embodiments described herein, mean field multiagent approaches are extended to multiple types. The types enable the relaxation of a core mechanism in mean field games, which is the assumption that all agents in the environment are playing almost similar strategies and have the same goal. Two new testbeds are considered for the field of many agent reinforcement learning, based on the MAgents testbed for many agent environments.

In some example embodiments, the approach considers two different kinds of mean field games. In the first kind of games, agents belong to predefined types that are known a priori. In the second kind of games, the type of each agent is unknown and therefore must be learned based on observations. New approaches are described for each of the scenarios and demonstrate superior performance to alternate approaches that assume that all agents belong to the same type and other baseline approaches in the MAgent framework.

While the embodiments described herein are examples relating to games, embodiments of the present application can be applied to other real-world, electronic, and/or artificial environments.

Single agent reinforcement learning [15] is a common form of reinforcement learning in the literature [1]. A problem can be modelled in the framework of a Markov Decision Process (MDP) where the MDP is composed of <S, A, P, R>, where S denotes the set of legal states that the agent can move into, A denotes the set of actions that the agent can take, P denotes the transition distribution P(s'|s,a) and R denotes the reward function R(s,a). Agents are allowed to explore the environment during the process of training and collect experience tuples <s, a, s', r>. An agent learns a policy $\pi:S \rightarrow A$ which is a mapping from the states to the actions where the goal is to maximize the expected cumulative rewards $\Sigma_t \gamma^t R(s_t, a_t)$ where $\gamma \in [0,1]$ is the discount factor. An optimal policy obtains the highest cumulative rewards among all possible policies.

In Multi Agent Reinforcement Learning (MARL), there is a notion of stochastic games [3], where the state and action space are incorporated as Cartesian products of individual states and actions of different agents in the environment. A stochastic game can be considered to be a special type of normal form game [9], where a particular iteration of the game depends on previous game(s) played and the experiences of all the agents in the previous game(s). A stochastic game can be defined as a tuple <S, N, A, P, R> where S is a finite set of states (assumed to be the same for all agents), N is a finite set of n agents, $A=A^1 \times \ldots \times A^n$ where $A^j$ denotes the actions of agent j. P is the transition probability function P(s'|s, a) where $a=(a^1, \ldots, a^n)$ and $R_j(s,a)=r^j$ is the reward function with $r^j$ denoting the reward received by agent j. Each agent is trying to learn a policy that maximizes its return upon consideration of opponent behaviours. Agents are typically self-interested and the combined system moves towards a Nash equilibrium [11]. Typically MARL is constrained by a problem of scale—scalability in MARL environments is often a bottleneck. Many research efforts are aimed at handling only up to a handful of agents and the solutions or approaches considered become intractable in large agent scenarios.

Mean field theory approximates many agent interactions in a multiagent environment into two agent interactions [10] where the second agent corresponds to the mean effect of all the other agents. This can allow domains with many agents that were previously considered intractable to be revisited and scalable approximate solution to be devised [17, 2]. A mean field game can be defined as a special kind of stochastic game. In some embodiments, the Q function for mean field games is decomposed additively into local Q-functions that capture pairwise interactions:

$$Q^j(s, a) = \frac{1}{n^j} \sum_{k \in \eta(j)} Q^j(s, a^j, a^k) \quad (1)$$

In equation (1), $n^j$ is the number of neighbours of agent j and $\eta(j)$ is the index set of neighboring agents. The decomposition can be well approximated by the mean field Q-function $Q^j(s,a) \approx Q_{MF}^j(s, a^j, \bar{a}^j)$ under certain conditions.

The mean action $\bar{a}^j$ on the neighborhood $\eta(j)$ of agent j is expressed as $$\bar{a}^j = \frac{1}{n^j} \sum_{k \in \eta(j)} a^k$$

where $a^k$ is the action of each neighbour k. In the case of discrete actions, $a^k$ is a one-hot vector encoding and $\bar{a}^j$ is a vector of fractions corresponding to the probability that each action may be executed by an agent at random.

In some embodiments, the mean field Q function can be updated in a recurrent manner as follows:

$$Q_{t+1}^j(s,a^j,\bar{a}^j)=(1-\alpha)Q_t^j(s,a^j,\bar{a}^j)+\alpha[r^j+\gamma v_t^j(s')] \quad (2)$$

where $r^j$ is the reward obtained. The s, s' are the old and new states respectively. $\alpha_t$ is the learning rate. The value function $v_t^j(s')$ for agent j at time t is given by:

$$v_t^j(s') = \sum_{a^j} \pi_t^j(a^j \mid s', \overline{a}^j) \mathbb{E}_{a_i^{-j} \sim \pi_{t,i}^{-j}} Q_t^j(s', a^j, \overline{a}^j) \quad (3)$$

where the term $\overline{a}^j$ denotes the mean action of all the other agents apart from j. The mean action for all the types is first calculated using the relation, $$\overline{a}_t^j = \frac{1}{N_t^j} \sum_k a_t^k, \quad a_t^k \sim \pi_t^k(\cdot \mid s, \overline{a}_-^k),$$

where $\pi_t^k$ is the policy of agent k and $\overline{a}_-^k$ represents the previous mean action for the neighbours of agent k. Then, the Boltzmann policy for each agent j is calculated using $\beta$ is the Boltzmann softmax parameter $$\pi_t^j(a^j \mid s, \overline{a}^j) = \frac{\exp(-\beta Q_t^j(s, a^j, \overline{a}^j))}{\sum_{a^{j'} \in A^j} \exp(-\beta Q_t^j(s, a^{j'}, \overline{a}^j))} \quad (4)$$

In some embodiments, there exist environments where there are M types that neighbouring agents can be classified into. In some embodiments, it can be assumed that the Q function decomposes additively according to a partition of the agents into $X^j$ subsets that each include one agent of each type. This decomposition can be viewed as a generalization of pairwise decompositions to multiple types since each term depends on a representative from each type.

A standard Q function can be defined as $Q^j(s,a)$:

$$Q^j(s, a) = \frac{1}{X^j} \sum_{i=1}^{X^j} [Q^j(s, a^j, a_1^{k_i}, a_2^{k_i}, \ldots, a_M^{k_i})] \quad (5)$$

There are a total of M types and $a_m^k$ denotes the action of agent k belonging to type m in the neighbourhood of agent j. This representation of the Q function includes the interaction with each one of the types, and is not a simple pairwise interaction, for example, as done by [17]. It may be assumed that there is not a scheme in which each agent can be classified into one of the subsets. Each group may not contain an equal number of agents, as it is possible to make a new subset that contains one agent of a type and other agents to be place holder agents (dead agents) of other types. In practice, decomposition may be relaxed, and it may not be necessary to generate subsets at all.

Discrete action spaces can be assumed and a one hot representation of the actions used, in an example, as in [17]. The one hot action of each agent k belonging to type m in the neighbourhood of agent j can be represented as $a_m^{k_m} = \overline{a}_m^j + \hat{\delta}^{j,k_m}$ where $\overline{a}_m^j$ is the mean action of all agents in the neighbourhood of agent j belonging to type m and $\hat{\delta}^{j,k_m}$ is the deviation between the action of an agent and the mean action of its type.

Let $\hat{\delta}^{j,k_i} = [\hat{\delta}^{j,k_1}; \hat{\delta}^{j,k_2}; \ldots; \hat{\delta}^{j,k_M}]$ be a vector obtained by the concatenation of all such deviations of the agents in the neighbourhood of agent j belonging to each of the M types (all agents of a single subset). Taylor's Theorem can eb applied to expand the Q function in equation (5):

$$Q^j(s, a) = \frac{1}{X^j} \sum_{i=1}^{X^j} Q^j(s, a^j, a_1^{k_i}, a_2^{k_i}, \ldots, a_M^{k_i})$$

$$= \frac{1}{X^j} \sum_{i=1}^{X^j} [Q^j(s, a^j, \overline{a}_1^j, \ldots, \overline{a}_M^j) +$$

$$\nabla_{\overline{a}_1^j, \ldots, \overline{a}_M^j} Q^j(s, a^j, \overline{a}_1^j, \ldots, \overline{a}_M^j) \cdot \hat{\delta}^{j,k_i} +$$

$$\frac{1}{2} \hat{\delta}^{j,k_i} \cdot \nabla^2_{\overline{a}_1^j, \ldots, \overline{a}_M^j} Q^j(s, a^j, \overline{a}_1^j, \ldots, \overline{a}_M^j) \cdot \hat{\delta}^{j,k_i}]$$

$$= Q^j(s, a^j, \overline{a}_1^j, \ldots, \overline{a}_M^j) +$$

$$\nabla_{\overline{a}_1^j, \ldots, \overline{a}_M^j} Q^j(s, a, \overline{a}_1^j, \overline{a}_2^j, \ldots, \overline{a}_M^j) \cdot$$

$$\left[\frac{1}{X^j} \sum_{i=1}^{X^j} \hat{\delta}^{j,k_i}\right] + \frac{1}{2X^j} \sum_{i=1}^{X^j}$$

$$[\hat{\delta}^{j,k_i} \cdot \nabla^2_{\overline{a}_1^j, \ldots, \overline{a}_M^j} Q^j(s, a^j, \overline{a}_1^j, \overline{a}_2^j, \ldots \overline{a}_M^j) \cdot \hat{\delta}^{j,k_i}]$$

$$= Q^j(s, a^j, \overline{a}_1^j, \ldots, \overline{a}_M^j) + \frac{1}{2X^j} \sum_{i=1}^{X^j} [R_{s,a^j}^j(a^{k_i})]$$

$$\approx Q^j(s, a, \overline{a}_1^j, \ldots, \overline{a}_M^j)$$

where $$R_{s,a^j}^j(a^k) \triangleq \hat{\delta}^{j,k} \cdot \nabla^2_{\overline{a}_1^j, \ldots, \overline{a}_M^j} Q^j(s, a^j, \overline{a}_1^j, \overline{a}_2^j, \ldots \overline{a}_M^j) \cdot \hat{\delta}^{j,k},$$

which is the Taylor polynomial remainder. The summation term $$\left[\frac{1}{X^j} \sum_{i=1}^{X^j} \hat{\delta}^{j,k_i}\right]$$

sums out to 0. Finally, ignoring the remainder terms $R_{s,a^j}^j$, the following approximation can be obtained:

$$Q^j(s,a) \approx Q_{MTMF}^j(s, a^j, \overline{a}_1^j, \ldots, \overline{a}_M^j) \quad (6)$$

The magnitude of this approximation depends on the deviation $\hat{\delta}^{j,k_m}$ between each action $a_m^{k_m}$ and its mean field approximation $\overline{a}_m^j$. More precisely, in some embodiments, the overall effect of the mean field approximation can be quantified by the average deviation $\Sigma_k \|\hat{\delta}_k\|_2/N$. Theorems 3.1 and 3.2 show that the average deviation is reduced as the number of types increases and Theorem 3.3 provides an explicit bound on the approximation in equation (6) based on the average deviation.

Theorem 3.1:

When there are two types in the environment, but they have been considered to be the same type, the average deviation induced by the mean field approximation is bounded as follows:

$$\frac{\sum_k \|\hat{\delta}_k\|_2}{N} \leq \frac{K_1}{N}\epsilon_1 + \frac{K_2}{N}\epsilon_2 + \frac{K_1}{N}\alpha_1 + \frac{K_2}{N}\alpha_2 \quad (7)$$

where N denotes the total number of agents in the environment; $K_1$ and $K_2$ denote the total number of agents of types 1 and 2, respectively; $\epsilon_1$ and $\epsilon_2$ are bounds on the average deviation for agents of types 1 and 2 respectively.

$$\frac{1}{K_1}\left(\sum_{k_1} \|a_{k_1} - \overline{a}_1\|\right) \leq \epsilon_1; \quad \frac{1}{K_2}\left(\sum_{k_2} \|a_{k_2} - \overline{a}_2\|\right) \leq \epsilon_2$$

Similarly, $\alpha_1$ and $\alpha_2$ denote the errors induced by using a single type (instead of two types) in the mean field approximation.

$$\alpha_1 = \|\bar{a}_1 - \bar{a}\|; \; \alpha_2 = \|\bar{a}_2 - \bar{a}\| \qquad (8)$$

Furthermore, $a_{k_1}$ denotes an action of an agent belonging to type 1 and $a_{k_2}$ denotes an action of an agent belonging to type 2. Here $\bar{a}$ denotes the mean field action of all the agents, $\bar{a}_1$ denotes the mean action of all agents of type 1 and $\bar{a}_2$ denotes the mean action of all agents of type 2.

Proof for Theorem 3.1:

By considering every agent to belong to only one type, the deviation between the agent's action and the overall mean action is the error estimate. Hence:

$$\frac{\sum_k \|\hat{\delta}_k\|_2}{N} = \frac{\sum_k \|a^j - \bar{a}^j\|_2}{N}$$

$$\frac{\sum_k \|\hat{\delta}_k\|_2}{N} = \frac{1}{N}\left(\sum_{k_1}\|a_{k_1} - \bar{a}\| + \sum_{k_2}\|a_{k_2} - \bar{a}\|\right)$$

The superscript j has been dropped for simplicity.

$$= \frac{1}{N}\left(\sum_{k_1}\|a_{k_1} - \bar{a}_1 + \bar{a}_1 - \bar{a}\| + \sum_{k_2}\|a_{k_2} - \bar{a}_2 + \bar{a}_2 - \bar{a}\|\right) \qquad (9)$$

$$\leq \frac{1}{N}\left(\sum_{k_1}\|a_{k_1} - \bar{a}_1\| + \sum_{k_1}\|\bar{a}_1 - \bar{a}\| + \sum_{k_2}\|a_{k_2} - \bar{a}_2\| + \sum_{k_2}\|\bar{a}_2 - \bar{a}\|\right)$$

$$= \frac{1}{N}\left(\sum_{k_1}\|a_{k_1} - \bar{a}_1\| + K_1\|\bar{a}_1 - \bar{a}\| + \sum_{k_2}\|a_{k_2} - \bar{a}_2\| + K_2\|\bar{a}_2 - \bar{a}\|\right)$$

$$\leq \frac{K_1}{N}\epsilon_1 + \frac{K_2}{N}\epsilon_2 + \frac{K_1}{N}\alpha_1 + \frac{K_2}{N}\alpha_2$$

Theorem 3.2:

When there are two types in the environment and they have been considered to be different types, the average deviation induced by the mean field approximation is bounded as follows:

$$\frac{\sum_k \|\hat{\delta}_k\|_2}{N} \leq \frac{K_1}{N}\epsilon_1 + \frac{K_2}{N}\epsilon_2 \qquad (10)$$

The variables have the same meaning as in Theorem 3.1.

Proof for Theorem 3.2:

In this scenario:

$$\frac{\sum_k \|\hat{\delta}_k\|_2}{N} = \frac{1}{N}\left(\sum_{k_1}\|a_{k_1} - \bar{a}_1\|_2 + \sum_{k_2}\|a_{k_2} - \bar{a}_2\|_2\right) \qquad (11)$$

$$= \frac{K_1}{N}\frac{\sum_{k_1}\|a_{k_1} - a_1\|_2}{K_1} + \frac{K_2}{N}\frac{\sum_{k_2}\|a_{k_2} - \bar{a}_2\|_2}{K_2}$$

$$\leq \frac{K_1}{N}\epsilon_1 + \frac{K_2}{N}\epsilon_2$$

Theorems 3.1 and 3.2 demonstrate the reduction in the bound on the average deviation the number of types increases from 1 to 2. Similar derivations can be performed to demonstrate that the bounds on the average deviation decrease as the number of types increases (regardless of the true number of types).

Let $\epsilon$ be a bound on the average deviation achieved based on a certain number of types:

$$\frac{\sum_{k=1}^{X}\|\delta\|_2}{X} \leq \epsilon.$$

Theorem 3.3 bounds the error of the approximate mean field Q-function as a function of $\epsilon$ and the smoothness L of the exact Q function.

Theorem 3.3:

When the Q-function is additively decomposable according to equation (5) and it is L-smooth, then the multi-type mean field Q function provides a good approximation bounded by $$|Q^j(s,a) - Q_{MTMF}^j(s,a^j,\bar{a}_1^j, \ldots, \bar{a}_M^j)| \leq \tfrac{1}{2}L\epsilon \qquad (12)$$

Proof for Theorem 3.3:

The expression for the Q function can be rewritten as $Q(a) \triangleq Q^j(s, a^j, \bar{a}_1^j, \bar{a}_2^j, \ldots, \bar{a}_M^j)$. Suppose that Q is L-smooth, where its gradient $\nabla Q$ is Lipschitz-continous with constant L such that for all a, $\bar{a}$:

$$\|\nabla Q(a) - \nabla Q(\bar{a})\|_2 \leq L\|a - \bar{a}\|_2 \qquad (13)$$

where $\|.\|_2$ indicates the $l_2$-norm. Note that all the eigenvalues of $\nabla^2 Q$ can be bounded in the symmetric interval [−L,L]. As the Hessian matrix $\nabla^2 Q$ is real symmetric and hence diagonalizable, there exists an orthogonal matrix U such that $U^T[\nabla^2 Q]U = \wedge \triangleq \text{diag}[\lambda_1, \ldots, \lambda_D]$. It then follows that:

$$\delta a \cdot \nabla^2 Q \cdot \delta a = [U\delta a]^T \wedge [U\delta a] = \Sigma_{i=1}^D \lambda_i [U\delta a]_i^2 \qquad (14)$$

with $$-L\|U\delta a\|_2 \leq \Sigma_{i=1}^D \lambda_i [U\delta a]_i^2 \leq L\|U\delta a\|_2 \qquad (15)$$

Let, $\hat{\delta}a = a_m^j - \bar{a}_m^j$, consistent with the previous definition. Recalling that the the term $\delta$ is then $\delta a = \hat{\delta}_1 a + \hat{\delta}_2 a + \ldots + \hat{\delta}_M a$, where a is the one-hot encoding for D actions, and $\bar{a}$ is a D-dimensional categorical distribution, it can be shown that $$\|U(\delta a)\|_2 = \|\delta a\|_2 \qquad (16)$$

Consider the term $$\frac{1}{2X}\sum_{k=1}^{X} R_{s,a^j}^j(a^k).$$

Since L is the maximum eigenvalue, from equation 14 can be re-annotated as:

$$R = \delta a \cdot \nabla^2 Q \cdot \delta a = [U\delta a]^T \wedge [U\theta a] = \Sigma_i \lambda_i [U\delta a]_i^2 \leq L\|U\delta a\|_2 \qquad (17)$$

Therefore, from equation (16):

$$R \leq L\|U\delta a\|_2 = L\|\delta a\|_2 \qquad (18)$$

Thus, $$\frac{1}{2X}\sum_k R \leq \frac{L}{2}\sum_k \frac{\|\delta a\|_2}{X} \leq \frac{L\epsilon}{2} \quad (19)$$

Thus, in embodiments described herein, the mean field Q function can be modified to include a finite number of types that each have a corresponding mean field. The Q function then considers a finite number of interactions across types.

The mean action $\bar{a}_i^j$ can represent the mean action of the neighbours of agent j belonging to type i. In some embodiments, the mean field Q function can be updated in a recurrent manner.

$$Q_{t+1}^j(s,a^j,\bar{a}_1^j,\bar{a}_2^j,\ldots \bar{a}_M^j) = (1-\alpha)Q_t^j(s,a^j,\bar{a}_1^j,\bar{a}_2^j,\ldots \bar{a}_M^j) + \alpha[r^j + \gamma v_t^j(s')] \quad (20)$$

where $r^j$ is the reward obtained, s and s' are the old and new states respectively, and $\alpha_t$ is the learning rate. The value function $v_t^j(s')$ for agent j at time t is given by:

$$v_t^j(s') = \sum_{a^j} \pi_t^j(a^j|s',\bar{a}_1^j,\ldots \bar{a}_M^j)\mathbb{E}_{a_t^{-j} \sim \pi_t^{-j}}[Q_t^j[s',a^j,\bar{a}_1^j,\ldots \bar{a}_M^j]] \quad (21)$$

where the term $\bar{a}_i^j$ denotes the mean action of all the other agents apart from j belonging to type i. In some embodiments, the mean action for all the types is first calculated using the relation:

$$\bar{a}_i^j = \frac{1}{N_i^j}\sum_k a_i^k, \; a_i^k \sim \pi_t^k(\cdot|s,\bar{a}_{1-}^k,\ldots,\bar{a}_{M-}^k) \quad (22)$$

where $\pi_t^k$ is the policy of agent k belonging to type i and $\bar{a}_{i-}^k$ represents the previous mean action for the neighbours of agent k belonging to type i. Then, the Boltzmann policy for each agent j is $$\pi_t^j(a^j|s,\bar{a}_1^j,\ldots \bar{a}_M^j) = \frac{\exp(\beta Q_t^j(s,a^j,\bar{a}_1^j,\ldots,\bar{a}_M^j))}{\sum_{a^{j'} \in A^j}\exp(\beta Q_t^j(s,a^{j'},\bar{a}_1^j,\ldots \bar{a}_M^j))} \quad (23)$$

where $\beta$ is the Boltzmann softmax parameter.

By iterating through equations (21), (22) and (23), the mean actions and respective policies of all agents may keep improving. As shown in the proof for Theorem 3.2 this approach converges to a fixed point within a small bounded distance of the Nash equilibrium.

Three assumptions may be made about the Multi Type Mean Field update and two lemmas can be used to prove Theorem 3.2:

Assumption 1:
In the Multi Type Mean Field update, each action-value pair is visited infinitely often, and the reward is bounded by some constant.

Assumption 2:
The agents policies are Greedy in the Limit with Infinite Exploration (GLIE). In the case of the Boltzmann policy, the policy becomes greedy w.r.t. the Q-function in the limit as the temperature decays asymptotically to zero.

Assumption 3:
For each stage game $[Q_t^1(s),\ldots Q_t^N(s)]$ at time t and in states in training, for all t, s, $j \in 1,\ldots,N$ the Nash equilibrium $\pi_* = [\pi_*^1,\ldots,\pi_*^N]$ is recognized either as a global optimum or a saddle point as expressed as:

1. $\mathbb{E}_{\pi_*}[Q_t^j(s)] \geq \mathbb{E}_{\pi}[Q_t^j(s)], \forall \pi \in \Omega(\Pi_k \mathcal{A}^k)$ \quad (24)

2. $\mathbb{E}_{\pi_*}[Q_t^j(s)] \geq \mathbb{E}_{\pi^j}\mathbb{E}_{\pi_*^{-j}}[Q_t^j(s)], \forall \pi^j \in \Omega(\mathcal{A}^k)$ \quad (25)

3. $\mathbb{E}_{\pi_*}[Q_t^j(s)] \leq \mathbb{E}_{\pi_*^j}\mathbb{E}_{\pi_*^{-j}}[(Q_t^j(s)], \forall \pi^{-j} \in \Omega(\Pi_k j^{\mathcal{A}^k})$ \quad (26)

Lemma 1:
Under Assumption 3, the Nash operator $\mathcal{H}^{Nash}$ forms a contraction mapping under the complete metric space from Q to Q with the fixed point being the Nash Q value of the entire game. $\mathcal{H}^{Nash}Q_* = Q_*$ Proof for Lemma 1:
Theorem 17 in [7] may provide a detailed proof for Lemma 1.

In some embodiments, a new operator $\mathcal{H}^{MTMF}$ is defined, which is a Multi Type Mean Field operator, and can be differentiated from the Nash operator defined above. Operator $\mathcal{H}^{MTMF}$ can be defined as:

$$\mathcal{H}^{MTMF}Q(s,a) = \mathbb{E}_{s' \sim p}[r(s,a) + \gamma v^{MTMF}(s')] \quad (27)$$

The Multi Type Mean Field value function can be defined as $v^{MTMF} \triangleq [v^1(s),\ldots,v^N(s)]$, obtained from equation (21). Using the same principle of Lemma 1 on the multi type mean field operator, it can be shown that the Multi Type Mean Field operator also forms a contraction mapping (additionally refer to Proposition 1 in [17]).

Lemma 2:
The random process $\Delta_t$ defined in $\mathcal{R}$ as $$\Delta_{t+1}(x) = (1-\alpha)\Delta_t(x) + \alpha F_t(x) \quad (28)$$

converges to a constant S with probability 1 (w.p.t 1) when

1) $0 \leq \alpha \leq 1, \Sigma_t \alpha = \infty, \Sigma_t \alpha^2 < \infty$ \quad (29)

2) $x \in X; |X| < \infty$ \quad (30)

where X is the set of possible states,

3) $\|\mathbb{E}[F_t(x)|\mathcal{F}_t]\|_w \leq \gamma \|\Delta_t\|_w + K$ \quad (31)

where $\gamma \in [0,1)$ and K is finite,

4) $\text{var}[F_t(x)|\mathcal{F}_t] \leq K_2(1 + \|\Delta_t\|_w^2)$ \quad (32)

with constant $K_2 > 0$ and finite.

Here $\mathcal{F}_t$ denotes the filtration of an increasing sequence of σ-fields including the history of processes; $\alpha_t, \Delta_t, F_t \in \mathcal{F}_t$ and $\|\cdot\|_w$ is a weighted maximum norm. The value of this constant $$S = \frac{\psi C_1 + \alpha|K|}{\alpha \beta_0}$$

where $\psi \in (0,1)$ and $C_1$ is the value with which the scale invariant iterative process is bounded. $\beta_0$ is the scale factor applied to the original process.

Proof for Lemma 2:
Lemma 2 follows from Theorem 1 in [8].

Theorem 3.4:
When updating $Q_{MTMF}^j(s, a^j, \bar{a}_1^j, \ldots, \bar{a}_M^j)$ according to equations (20), (21), (22) and (23), $Q_{MTMF}^j(s, a^j, \bar{a}_1^j, \ldots, \bar{a}_M^j)$ will converge to a bounded distance of the Nash-Q equilibrium under Assumptions 1, 2 and 3:

$$Q_*(s,a) - Q_t(s,a) \leq D - S$$

where $$S = \frac{\psi C_1 + \alpha \gamma |D|}{\alpha \beta_0} \text{ and } D = \frac{1}{2}L\epsilon,$$

from Theorem 3.3.

Proof for Theorem 3.4:

The proof of convergence of Theorem 3.4 can be structurally similar to that discussed by the authors in [7] and [17].

In Assumption 3, equation (24) corresponds to the global optimum and equations (25) and (26) correspond to the saddle point. These assumptions can be the same as those considered in [7]. Assumption 3 can be a strong assumption to impose, which is needed to show the theoretical convergence, but this is not required to impose in practice.

The Nash operator $\mathcal{H}^{Nash}$ is defined by:

$$\mathcal{H}^{Nash} = \mathbb{E}_{s'\sim p}[r(s,a) + \gamma v^{Nash}(s')] \tag{33}$$

where $Q \triangleq [Q^1, \ldots, Q^N]$ and $r(s,a) \triangleq [r^1(s,a), \ldots, r^N(s,a)]$ The Nash value function is $v^{Nash}(s) \triangleq [v_{\pi_*}^1(s), \ldots, v_{\pi_*}^N(s)]$, with the Nash policy represented as $\pi_*$. The Nash value function is calculated with the assumption that all agents are following $\pi_*$ from the initial state s.

Lemma 2 may be applied to prove Theorem 3.2. By subtracting $Q_*(s,a)$ on both sides of equation (20) and in relation to equation (28) results in:

$$\Delta_t(x) = Q_t(s, a^j, \bar{a}_1^j, \ldots, \bar{a}_M^j) - Q_*(s,a)$$

$$F_T(x) = r_t + \gamma v_t^{MF}(s_{t+1}) - Q_*(s_t, a_t) \tag{34}$$

where $x \triangleq (s_t, a_t)$ denotes the visited state-action pair at time t.

In Theorem 3.1, a bound for the actual Q function and the multi type mean field Q function can be proven, and applying it in equation (34) results in the following equation for $\Delta$:

$$\Delta_t(x) = Q_t(s, a^j, \bar{a}_1^j, \ldots, \bar{a}_M^j) - Q_*(s,a)$$

$$\Delta_t(x) = Q_t(s, a^j, \bar{a}_1^j, \ldots \bar{a}_M^j) + Q_t(s,a) - Q_t(s,a) - Q_*(s,a)$$

$$\Delta_t(x) \leq |Q_t(s, a^j, \bar{a}_1^j, \ldots, \bar{a}_M^j) - Q_t(s,a)| + Q_t(s,a) - Q_*(s,a)$$

$$\Delta_t(x) \leq Q_t(s,a) - Q_*(s,a) + D \tag{35}$$

where $$D = \frac{1}{2}L\epsilon.$$

The aim is to prove that the four conditions of Lemma 2 hold and that $\Delta$ in equation (35) converges to a constant S according to Lemma 2 and thus the MTMF Q function in equation (35) converges to a point whose distance to the Nash Equilibrium is bounded. In equation (28), $\alpha(t)$ refers to the learning rate and hence the first condition of Lemma 2 is automatically satisfied. The second condition is also true, dealing with finite state and action spaces.

Let $\mathcal{F}_t$ be the $\sigma$-field generated by all random variables in the history time $t-(s_t, \alpha_t, a_t, r_{t-1}, \ldots, s_1, \alpha_1, a_1, Q_0)$. Thus, $Q_t$ is a random variable derived from the historical trajectory up to time t.

To prove the third condition of Lemma 2, from equation (34):

$$F_t(s_t, a_t) = r_t + \gamma v_t^{MTMF} - Q*(s_t, a_t) = \tag{36}$$

$$r_t + \gamma v_t^{Nash} - Q*(s_t, a_t) + \gamma[v_t^{MTMF}(s_{t+1}) - v_t^{Nash}(s_{t+1})] =$$

$$(r_t + \gamma v_t^{Nash} - Q*(s_t, a_t)) + C_t(s_t, a_t) = F_t^{Nash}(s_t, a_t) + C_t(s_t, a_t)$$

From Lemma 1, $F_t^{Nash}$ forms a contraction mapping with the norm $\|\bullet\|_\infty$ being the maximum norm on a. Thus from equation (35), $$\| \mathbb{E}[F_t^{Nash}(s_t, a_t) | F_t] \|_\infty \leq \gamma \|Q_* - Q_t\|_\infty \leq \gamma \|D - \Delta_t\|_\infty \tag{37}$$

Applying equation (37) in equation (36):

$$\| \mathbb{E}[F_t(s_t, a_t) | \mathcal{F}_t] \|_\infty = \|F_t^{Nash}(s_t, a_t) | \mathcal{F}_t\|_\infty + \|C_t(s_t, a_t) | \mathcal{F}_t\|_\infty$$

$$\leq \gamma |D - \Delta_t|_\infty + \|C_t(s_t, a_t)| \mathcal{F}_t\|_\infty$$

$$\leq \gamma \|\Delta_t\|_\infty + \|C_t(s_t, a_t)| \mathcal{F}_t\|_\infty + \gamma|D|\|_\infty \leq \gamma\|\Delta_t\|_\infty + \gamma|D| \tag{38}$$

Taking the max norm, the last two terms in the right hand side of equation (38) are both positive and finite. It can be proven that the term $\|C_t(s_a, a_t)\|$ converges to 0 with probability one. The proof involves the use of Assumption 3 (refer to Theorem 1 in [17] for detailed proof), and can be used in the last term of Equation 38. Hence, the third condition of Lemma 2 is proved. The value of constant $K = \gamma|D| = \gamma|\frac{1}{2}L\epsilon|$.

For the fourth condition the fact that the MTMF operator $\mathcal{H}^{MTMF}$ forms a contraction mapping can be used. Hence, $\mathcal{H}^{MTMF}Q_* = Q_*$ and it follows that:

$$\text{var}[F_t(s_t, a_t)|\mathcal{F}_t] = E[(r_t + \gamma v_t^{MTMF}(s_{t+1}) - Q*(s_t, a_t))^2] = \tag{39}$$

$$E[(r_t + \gamma v_t^{MTMF}(s_{t+1}) - \mathcal{H}^{MTMF}(Q_*))^2] =$$

$$\text{var}[r_t + \gamma v_t^{MTMF}(s_{t+1})|\mathcal{F}_t] \leq K_2(1 + \|\Delta_t\|_W^2)$$

In the last step, the left side of the equation contains the reward and the value function as the variables. The reward is bounded by Assumption 1 and the value function is also bounded by being updated recursively by equation (21) (MTMF is a contraction operator). A positive, finite $K_2$ can be chosen such that the inequality holds.

Finally, with all conditions met, it follows from Lemma 2 that $\Delta_t$ converges to constant S with probability 1. The value of this constant is $$S = \frac{\psi C_1 + \alpha\gamma|D|}{\alpha\beta_0}$$

from Lemma 2 and using the value of K derived above. Therefore, from equation (35):

$$Q_*(s,a) - Q_t(s,a) \leq D - S \leq \frac{1}{2}L\epsilon - S \tag{40}$$

Hence the Q function converges to a point within a bounded distance from the real Nash equilibrium of the game. The distance is a function of the error in the type classification and the closeness of resemblance of each agent to its type.

Systems and methods for multi type mean field Q learning may be embodied as algorithms based on Q-learning to estimate the multi-type mean field Q-function for known and unknown types.

In an example algorithm, MTMFQ (Multi-Type Mean Field Q-learning), trains an agent j to minimize the loss function $\mathcal{L}(\phi^j) = (y^j - Q_{\phi^j}(s, a^j, \bar{a}_1^j, \ldots, \bar{a}_M^j))^2$. Here $y^j = r^j + \gamma v_{\phi^j}^{MTMF}(s')$ is the target value used to calculate the TD error using the weights $\phi^j$. Here the $v^{MTMF}(s) \triangleq [v^1(s), \ldots, v^N(s)]$. Now, gradient can be taken as, $$\nabla_{\phi^j}\mathcal{L}(\phi^j) = 2(Q_{\phi^j}(s, a^j, \bar{a}_1^j, \ldots, \bar{a}_M^j) - y^j) \times \nabla_{\phi^j}Q_{\phi^j}(s, a^j, \bar{a}_1^j, \ldots, \bar{a}_M^j) \tag{41}$$

Algorithm 1, as shown by way of example illustrated in high-level pseudo-code in FIG. 7, describes the Multi Type Mean Field Q learning (MTMFQ) algorithm when agent types are known. In this algorithm, different groups of agents in the environment are considered as types. An agent models its relation to each type separately and ultimately chooses the action that provides maximum benefit in the face of competition against the different types. This is referred to as version 1 of MTMFQ. This algorithm deals with multiple types in contrast to MFQ described in the paper by [17]. In Line 8, each agent is chosen and its neighbours are considered. The neighbours are classified into different types and in each type a new mean action is calculated (Line 9). In Lines 14-19, the Q networks are updated as done in common practice [13] for all the agents in the environment. At Line 12, the current actions are added to a buffer containing previous mean actions.

In another embodiment, a second version of MTMFQ (see Algorithm 1), or Algorithm 2, is illustrated in high-level pseudo-code in FIG. 8, deals with a second type of scenario, where the type of each agent is unknown. An additional step doing K-means clustering is introduced to determine the types. Once the type of each agent is recognized, the algorithm is very similar to Algorithm 1. The clustering may not necessarily recognize the types correctly and the overall process may not be as efficient as the known type case. However, this approximate type determination may be an improvement over using only a single mean field for all the agents. For the implementation, neural networks may be used, however in some embodiments, it can be done without neural networks too, using a technique to recursively update equations (21), (22) and (23).

In some embodiments, the total number of types in the environment may be unknown and the agent does not need to guess the correct number of types. Generally, the more types are used, the closer the approximate Q-function may be to the exact Nash Q-function as shown by the bounds in Theorems 3.1, 3.2, 3.3 and 3.4. Conveniently, there may be no risk of overfitting when using more types. In the limit, when there is one type per agent, the exact multi-agent Q-function is recovered. The only drawback may be an increase in computational complexity.

Results with three games designed within the MAgents framework are illustrated: Multi Team Battle (FIGS. 1A-1C), Battle-Gathering (FIGS. 2A-2C) and Predator Prey (FIGS. 3A-3C) domains. In the first two games, Multi Team Battle and the Battle-Gathering game, the conditions are such that the different groups are fully known upfront. In the third game, the conditions are such that the types of the agents are initially unknown. Hence, the agents must also learn the identity of the opponent agents during game play. Multi Team Battle and Gathering are two separately existing MAgent games, which have been combined to obtain the Battle-Gathering game described herein. Predator Prey domain is also obtained from combining Multi Team Battle with another existing MAgent game (Pursuit). In preparation for each game, agents train for 2000 episodes of game play against different groups training using the same algorithm, which is referred to as the first stage. Next, in the second stage, they enter into a faceoff against other agents trained by other algorithms where they fight each other for 1000 games. Results for both stages are recorded. All experiments were repeated 50 times and the averages reported. As can be seen from the nature of the experiments, variances can be quite large across individual experimental runs.

In an illustrative example of a first game 1000 (Multi Team Battle, see FIG. 1A), there are four teams (different colors or markers in FIG. 1A) fighting against each other to win a battle. Agents belonging to one team are competing against agents from other teams and cooperating with agents of the same team. During the first stage, a team does not know how the other teams will play during the faceoff—so it clones itself to three additional teams with slightly different rewards in order to induce different strategies. This is similar to self play. Each agent receives a reward equal to the sum of the local rewards attributed to each agent in the team. The reward function is defined in such a way that it encourages local cooperation in killing opponents and discourages getting attacked and dying in the game. The reward function for different agent groups may also be subtly different. Each of these Groups may be defined as: Group A, Group B, Group C, and Group D. A notion of favourable opponents may be maintained and each Group gets slightly higher rewards for killing the favourable opponents than the others. Four algorithms, namely MFQ (mean field Q-learning) [17], MFAC (mean field Actor-Critic) [17], Independent Q Learning (IL) [16], and MTMFQ (for example, Algorithm 1 or Algorithm 2, using equations (20)-(23)) are trained separately where each of these groups trains its own separate network using the same algorithm. All of the battles start with 72 agents of each group for training and testing. Group A from MTMFQ, Group B from IL, Group C from MFQ, and Group D from MFAC enter the faceoff stage where they fight each other for 1000 games. Each game (or episode) has 500 steps and a game is considered to be won by the group/groups that have the maximum number of agents alive at the end of the game.

Figure 1B:
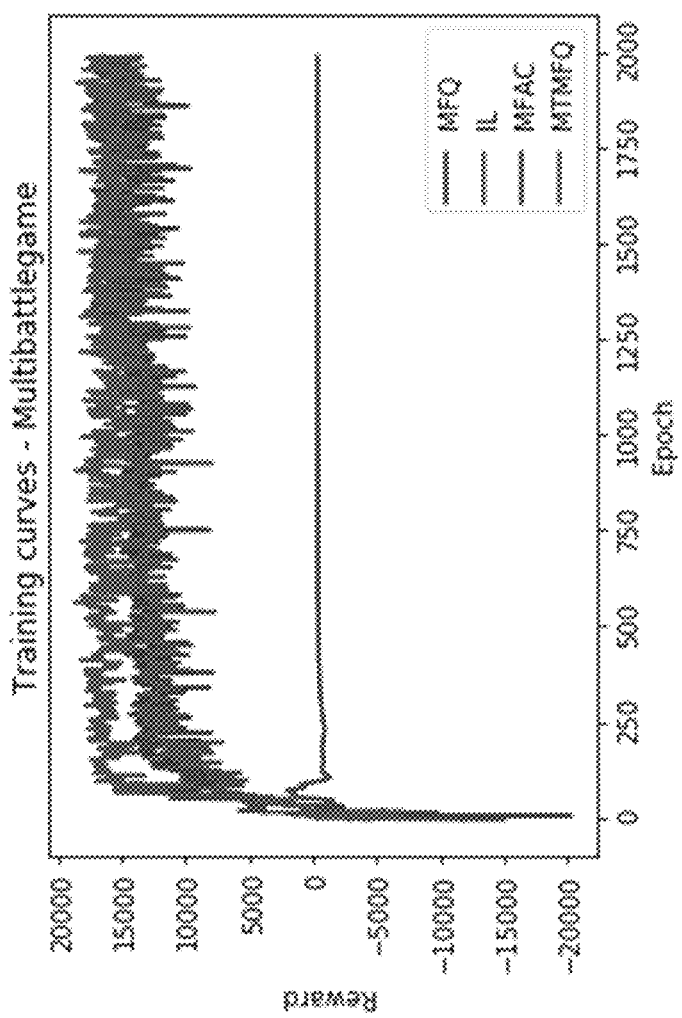
FIG. 1B is a chart showing training results for the multi-team battle environment of FIG. 1A.
Figure 1C:
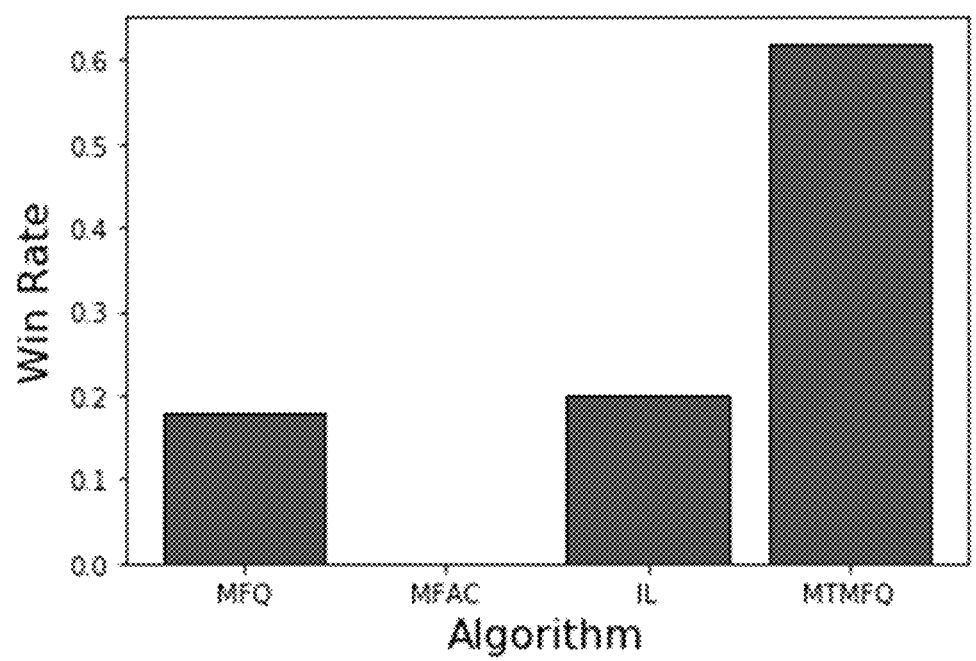
FIG. 1C is a chart showing win rates for the multi-team battle environment of FIG. 1A.
Figure 1D:
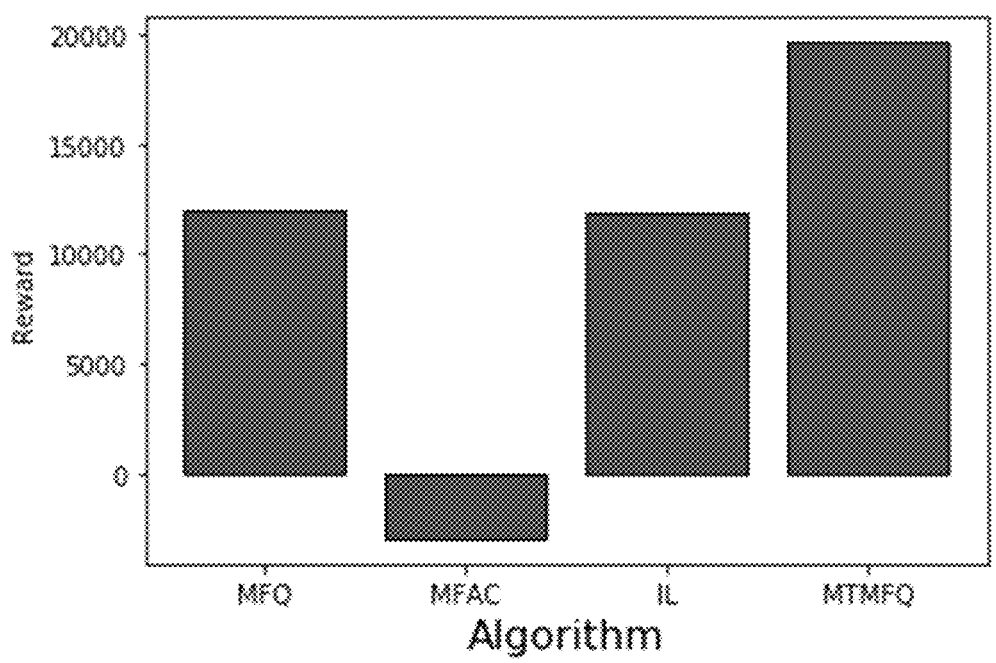
FIG. 1D is a chart showing total rewards for the multi-team battle environment of FIG. 1A.

The results of the first training stage are reported in FIG. 1B, illustrating the cumulative rewards from all agents in Group A for each algorithm. These rewards are for Group A against the other three groups. In the training stage, the teams trained by different algorithms did not play against each other, but simply against the cloned teams trained by the same algorithm. At the beginning of training, for about 100 episodes the agents are still exploring and their strategies are not well differentiated yet. As a result, MTMFQ's performance is still comparable to the performance of other algorithms. At this stage, the assumption of a single type may be suitable. As training progresses, each group begins to identify the favorable opponents and tries to make a targeted approach in the battle. When such differences exist across a wide range of agents, the MTMFQ algorithm shows a better performance than the other techniques as it explicitly considers the presence of different types in the game. Overall, it can be observed that MTMFQ has a faster convergence than all other algorithms and it also produces higher rewards at the end of the complete training. This shows that MTMFQ identifies favorable opponents early, but the other algorithms struggle longer to learn this condition. The MFAC algorithm is the worst overall. This is consistent with the observation by [17], where the authors give particular reasons for this bad performance, including the Greedy in the limit with infinite exploration (GLIE) assumption and a positive bias of Q learning algorithms. This algorithm is not able to earn an overall positive reward upon the complete training. FIG. 1C shows the win rate of the teams trained by each algorithm (MTMFQ, MFQ, MFAC, and IL) in a direct faceoff of 1000 episodes. In the face off, each group is trained by a different algorithm and with a different reward function that induces different strategies. The only algorithm that properly handles different strategies among the opponent teams is MTMFQ and therefore it dominates the other algorithms with a win rate of 60%. Also, FIG. 1D reinforces this domination.

Figure 2A:
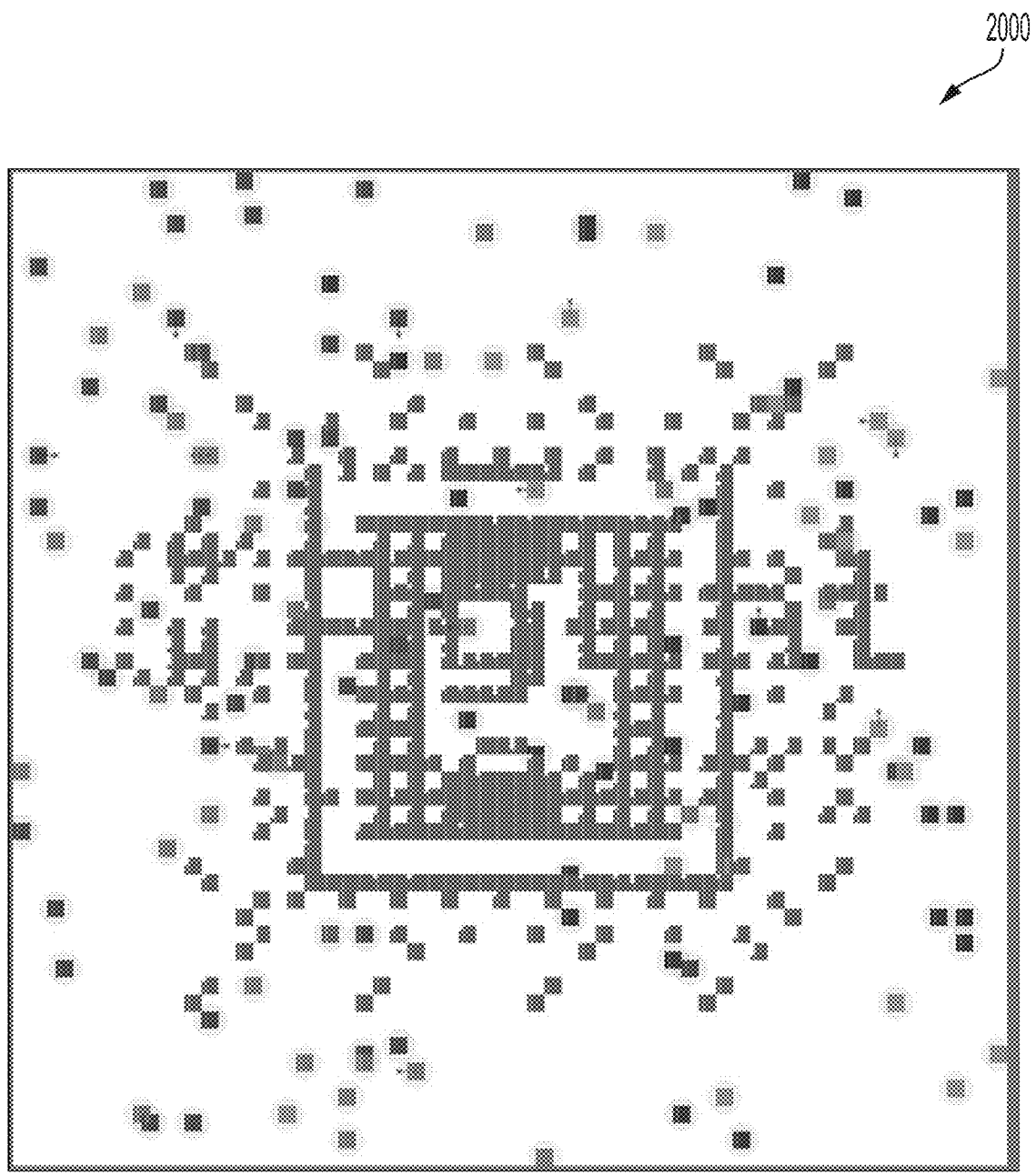
FIG. 2A shows aspects of an example gathering game environment.

An illustrative example of a second game 2000 in a second domain is shown in the Battle-Gathering game FIG. 2A. In the Battle-Gathering game 2000, all the agent groups compete for food resources that are limited (red or "x" markers denote food particles and other colours or markers are competing agents) in addition to killing its opponents as in the Multi Team Battle game. Hence, this game is harder than a Multi Team Battle game such as game 1000. All the training and competition are similar to a Multi Team Battle game such as game 1000.

Figure 2B:
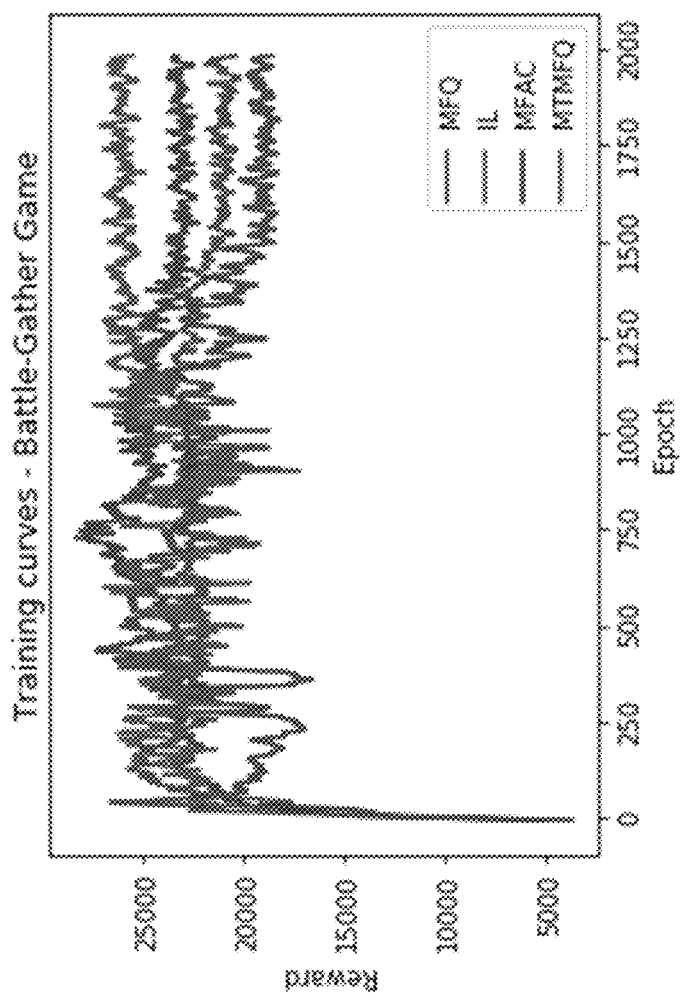
FIG. 2B is a chart showing training results for the gathering game environment of FIG. 2A.
Figure 2C:
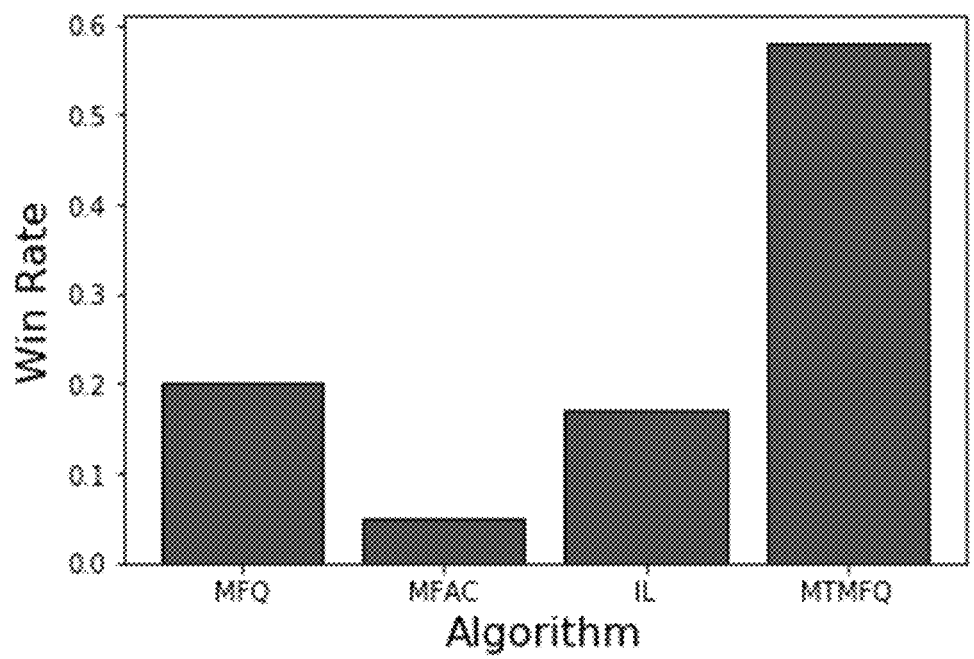
FIG. 2C is a chart showing win rates for the gathering game environment of FIG. 2A.
Figure 2D:
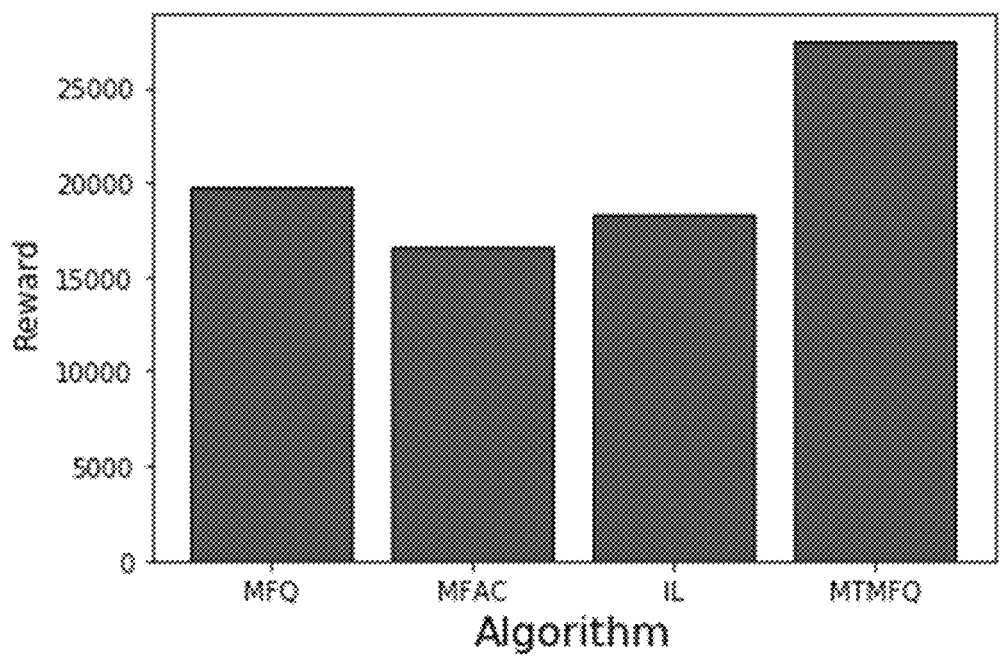
FIG. 2D is a chart showing total rewards for the gathering game environment of FIG. 2A.

FIG. 2B reports the results of training in Battle-Gathering game 2000. Like the Multi Battle Game 1000, the rewards obtained by Group A while fighting other groups are plotted for each algorithm. Again, MTMFQ shows the strongest performance in comparison to the other three algorithms. The MFQ technique performs better than both MFAC and IL. In this game, MTMFQ converges in around 1500 episodes, while the other algorithms take around 1800 episodes to converge. The win rates shown in FIG. 2C and the total rewards reported in FIG. 2D also show the dominance of MTMFQ.

Figure 3A:
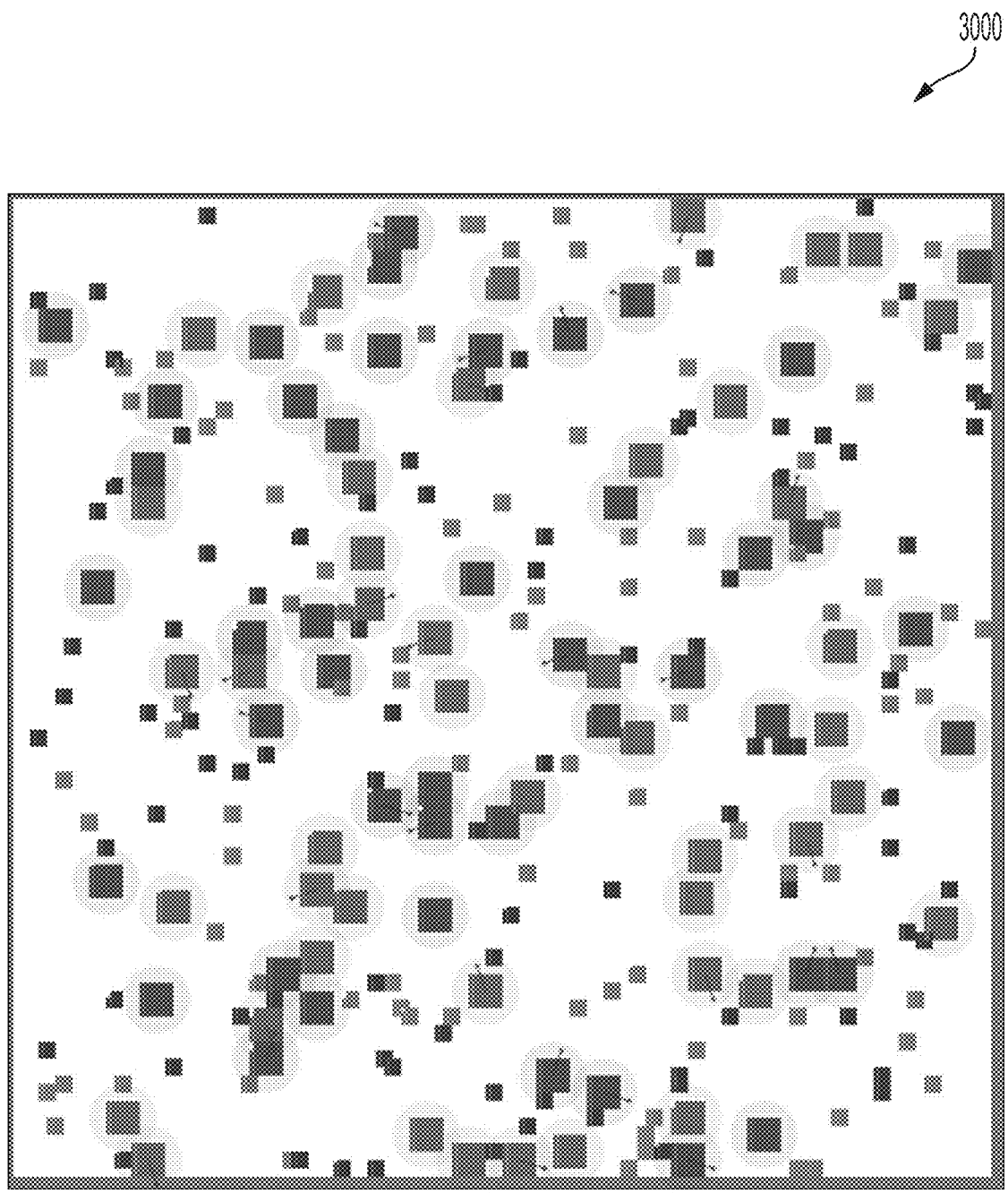
FIG. 3A shows aspects of an example predator prey game environment.

A third domain is the multiagent Predator Prey game 3000, illustrated by way of example in FIG. 3A. The Predator Prey game has two distinct types of agents—predator and prey, each having completely different characteristics. The prey are faster than the predators and their ultimate goal is to escape the predators. The predators are slower than the prey, but they have higher attacking abilities than the prey, so the predators try to attack more and kill more prey. This game is modelled as an unknown type scenario where the types of the other agents in the competition are not known before hand. The MTMFQ algorithm plays the version with unknown types (for example, Algorithm 1). In the illustrated example, there are four groups with the first two groups (Groups A and B) being predators and the other two groups (Groups C and D) being prey. Each algorithm will train two kinds of predator agents and two kinds of prey agents. All these agents are used in the playoff stage. In the playoff stage there are 800 games where the algorithm of predator and prey is changed at every 200 games to maintain a fair competition. For the first 200 games, MTMFQ plays Group A, MFQ plays Group B, IL plays Group C, and MFAC plays Group D. In the next 200 games, MFAC plays Group A, MTMFQ plays Group B, MFQ plays Group C and IL plays Group D, and so on. All training and testing episodes start with 90 prey and 45 predators for each group. Winning a game in the playoff stage is defined in the same way as the other two games described herein (Multi Team Battle and Battle-Gathering). This may make it more fair, as predators have to kill a lot more prey to win the game (as the start has more prey than predators) and prey have to survive longer. In this setup, the highly different types of agents make type identification easier for MTMFQ (as the types are initially unknown). The prey execute more move actions while the predators execute more attack actions. This can be well differentiated by clustering.

Figure 3B:
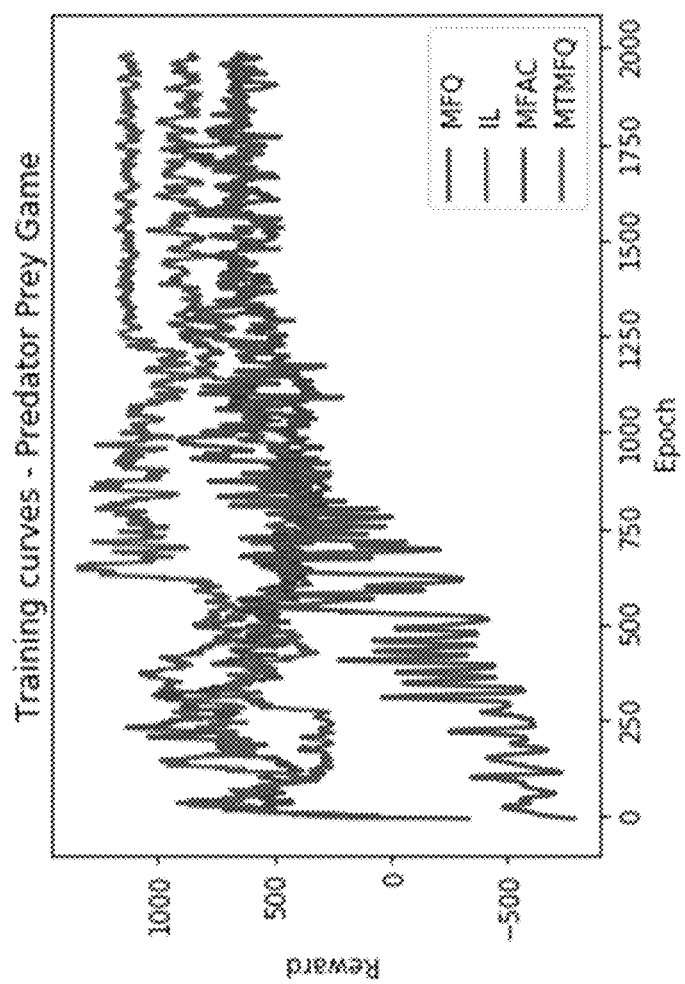
FIG. 3B is a chart showing training results for the predator prey game environment of FIG. 3A.
Figure 3C:
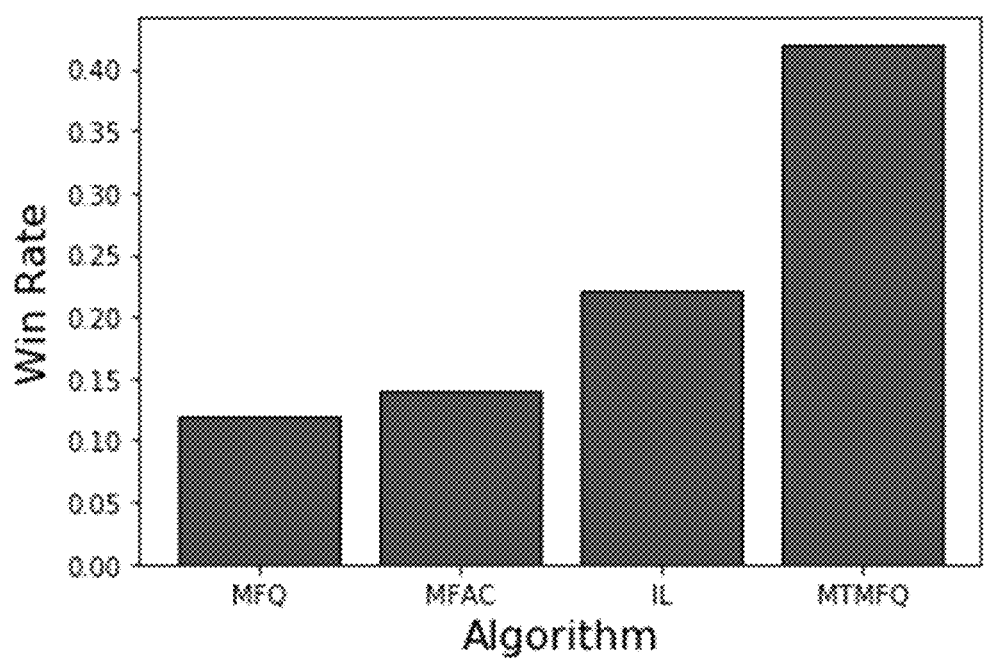
FIG. 3C is a chart showing win rates for the predator prey game environment of FIG. 3A.
Figure 3D:
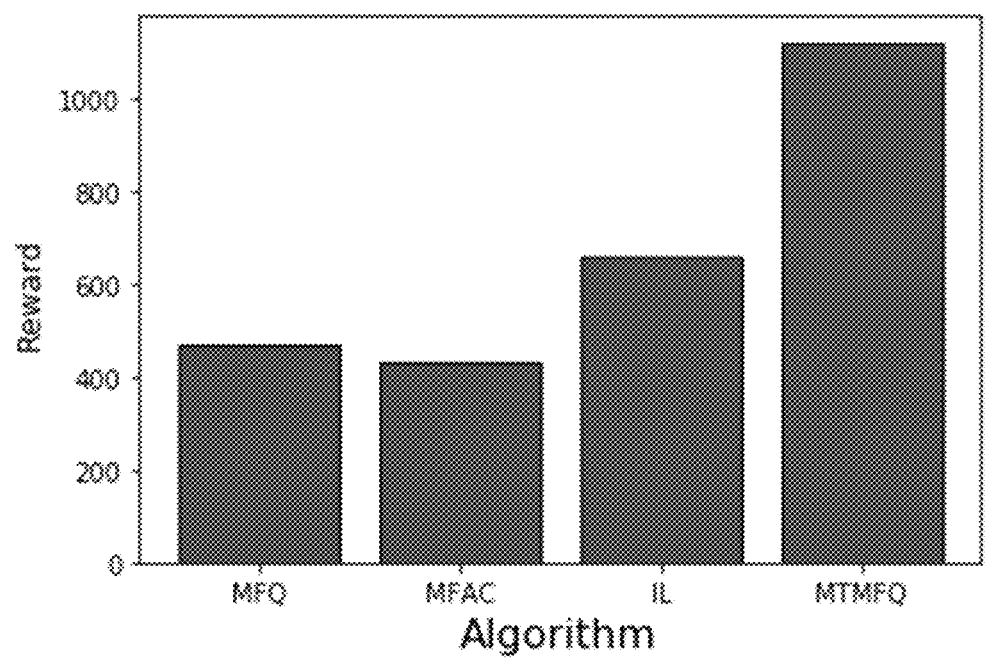
FIG. 3D is a chart showing total rewards for the predator prey game environment of FIG. 3A.

The results of the first training stage are reported in FIG. 3B. MTMFQ has comparable or even weaker performance than other algorithms in the first 600 episodes of the training and the reasoning is similar to the reasoning in the Multi Battle game (the agent strategies are not sufficiently differentiated for multiple types to be useful). For the Predator Prey game, MTMFQ takes many more episodes than the earlier two games to start dominating. This is because of the inherent difficulty of the domain compared to the other domains (very different and unknown types). Similar to observations in the other domains, MTMFQ converges earlier (after around 1300 episodes as opposed to 1700 for the other algorithms). This shows its robustness to the different kinds of opponents in the environment. MTMFQ also gains higher cumulative rewards than the other algorithms. Win rates in FIG. 3C show that MTMFQ still wins more games than the other algorithms, but the overall number of games won is less than the other domains. Thus, irrespective of the difficulty of the challenge it can be seen that MTMFQ has an upper hand. The lead of MTMFQ is also observed in FIG. 3D.

In some embodiments of the present application, mean field theory is extended to multiple types in MARL. The example environments and experiments demonstrate that reducing many agent interactions to simple two agent interactions does not give very accurate solutions in environments where there are clearly different teams/types playing different strategies. In some embodiments of the present disclosure, an agent has to consider different types for different agents and explicitly model the strategy of the type as a whole. Within a type, the agents can, in some embodiments, be assumed to be fairly similar in properties and hence the notion of mean field theory is assumed to be applicable. Experiments using MAgents demonstrate superior performances using a type based approach. In some instances, aspects of the present application may provide a different dimension to the mean field theory based MARL research and may, in some situations, enable obtaining solutions for problems previously considered intractable in literature.

In some embodiments, systems and methods described herein can be applied to completely heterogeneous agents with different action spaces, and in such a scenario, clustering may be easier.

In some embodiments, the presence of sub types after classification may also be considered.

In some embodiments, aspects of the present application can be applied to a reinforcement learning agent for executing trade orders on behalf of clients. In some approaches, all investors can be abstracted as "the market". This more or less corresponds to the mean field approximation. However not all investors are of the same type. Some investors are buyers and others are sellers. Furthermore some of them are risk averse and others are risk seeking. Aspects of the systems, methods and architectures described herein or otherwise could be used to segment the market into investors of various types. In some embodiments, the types are defined (as being known) to be buyers and sellers and the system is implemented with the first approach. In some embodiments, the types are defined as risk averse or risk seeking (the types can be unknown), and the system is implemented based on the second scenario.

It will thus be appreciated that multi type mean field Q learning can have application in financial settings.

In some embodiments, another potential application of embodiments of multi type mean field Q learning would be in traffic management, for example, multiple autonomous cars, combined with individuals driving cars, then could have explicit reasoning over two types. In another example, vehicles may come from many different manufacturers of unknown quantity, and may behave differently. Aspect of the present application can be applied to cars that are near an agent (for example, in a neighbourhood), and reason over them to determine how to behave.

Figure 9:
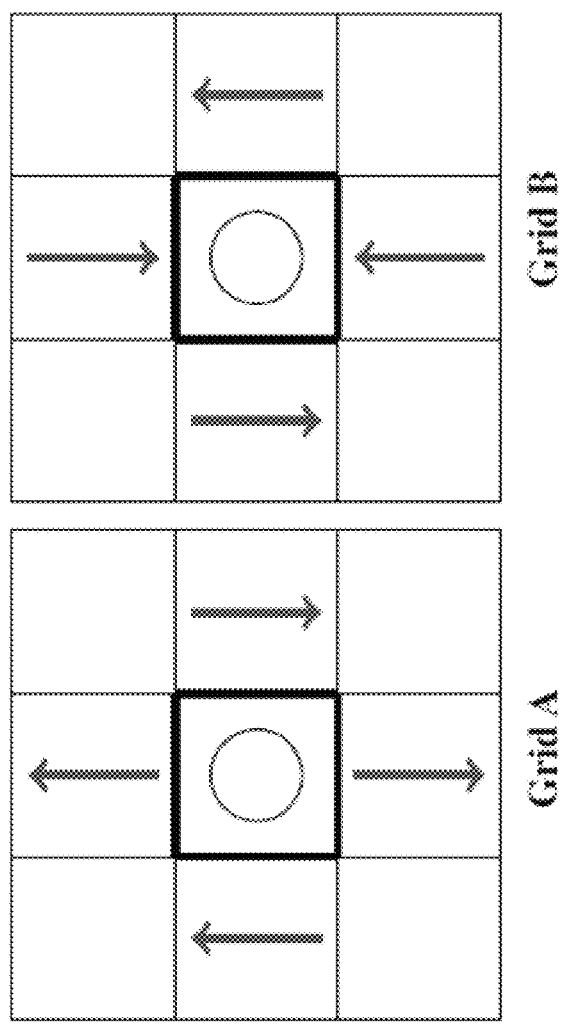
FIG. 9 shows a counter example simulated using multi type mean field Q learning, according to an embodiment.

An illustrative example is provided in FIG. 9 of a simulated scenario where an embodiment of a Multi Type Mean Field algorithm may be more useful than a simple mean field algorithm.

In an example game, a central agent has to decide the direction of spin. The domain is stateless. The spin direction is influenced by the direction of spin of its A, B, C and D neighbours (four neighbours in total). A is denoted as the neighbour to the left of Agent, B as the neighbour to the top of the agent, C as the neighbour to the right of the agent and D as the neighbour to the bottom of the agent. The neighbour agents spin in one direction at random. If the agent spins in the same direction as both of its C and D neighbours, the agent gets a reward of −2 regardless of what the A and B are doing. If the spin is in the same direction as both of its A and B neighbours, the agent gets a +2 reward unless the direction is not the same as the one used by both of its C and D neighbours. All other scenarios result in a reward of 0. So the agent in Grid A in FIG. 9 will get a −2 for the spin down (since the C and D neighbours are spinning down) and a +2 for a spin up (since the A and B neighbours are spinning up). In Grid B of FIG. 9 the agent will get a −2 for spin up and a +2 for spin down. It is clear that the best action in Grid A is to spin up and the best action in Grid B is to spin down.

In some embodiments, a multi stage game can include many individual stages. In each stage of a multi stage game, one or more players take one action each, simultaneously and obtain rewards.

In a sample sequence of stage games, the agent gets Grid A for every 2 consecutive stages and then the Grid B for the third stage. The goal of the agent is to take the best possible action at all stages. Assuming that the agent continues to learn at all stages and it starts with Q values of 0. Applying MFQ (equation (2)) and MTMFQ (equation (20)), it can be seen why MFQ fails, but MTMFQ succeeds in this situation. Below, the Q values for the 3 stages are calculated using both the MFQ (from [17]) and the MTMFQ update rules. The average action is approximated using the number of times the neighbourhood agents spin up. In the MTMFQ the A, B neighbours are used as the type 1 and the C, D neighbours as the type 2.

Applying MFQ:
In the first stage, $$Q_1^j(1,\bar{a}^j=2)=0+0.1(2-0)=0.2$$

$$Q_1^j(1,\bar{a}^j=2)=0+0.1(-2-0)=-0.2$$

Thus, the agent will chose to spin up in the first stage (correct action).

For the second stage, $$Q_2^j(1,\bar{a}^j=2)=0.38$$

$$Q_2^j(1,\bar{a}^j=2)=-0.38$$

Again the agent will chose to spin up in the second stage (correct action).

For the third stage, $$Q_3^j(1,\bar{a}^j=2)=0.38+0.1(-2-0.38)=0.142$$

$$Q_3^j(1,\bar{a}^j=2)=-0.38+0.1(2+0.38)=-0.142$$

Here again the agent will chose to make the spin up (wrong action).

Now coming to MTMFQ updates, for the first stage, $$Q_1^j(1,\bar{a}_1^j=2,\bar{a}_2^j=0)=0+0.1(2-0)=0.2$$

$$Q_1^j(1,\bar{a}_1^j=2,\bar{a}_2^j=0)=0+0.1(-2-0)=-0.2$$

Here the agent will spin up (correct action).
For the second stage, $$Q_2^j(1,\bar{a}_1^j=2,\bar{a}_2^j=0)=0.38$$

$$Q_2^j(1,\bar{a}_1^j=2,\bar{a}_2^j=0)=-0.38$$

Again the agent will spin up (correct action).
For the third stage, $$Q_3^j(1,\bar{a}_1^j=0,\bar{a}_2^j=2)=-0.2$$

$$Q_3^j(1,\bar{a}_1^j=0,\bar{a}_2^j=2)=0.2$$

Now it can be seen that the agent will spin down in this case (correct action).

Thus the MFQ agent will make one wrong move out of 3 moves whereas the MTMFQ agent will make the right move all the time. In situations like these, where the relationship of the agent with different neighbour agents is different, the MFQ algorithm would fail. The differences would be captured by MTMFQ which would take more efficient actions. This shows an example where MTMFQ outperforms MFQ.

Figure 4:
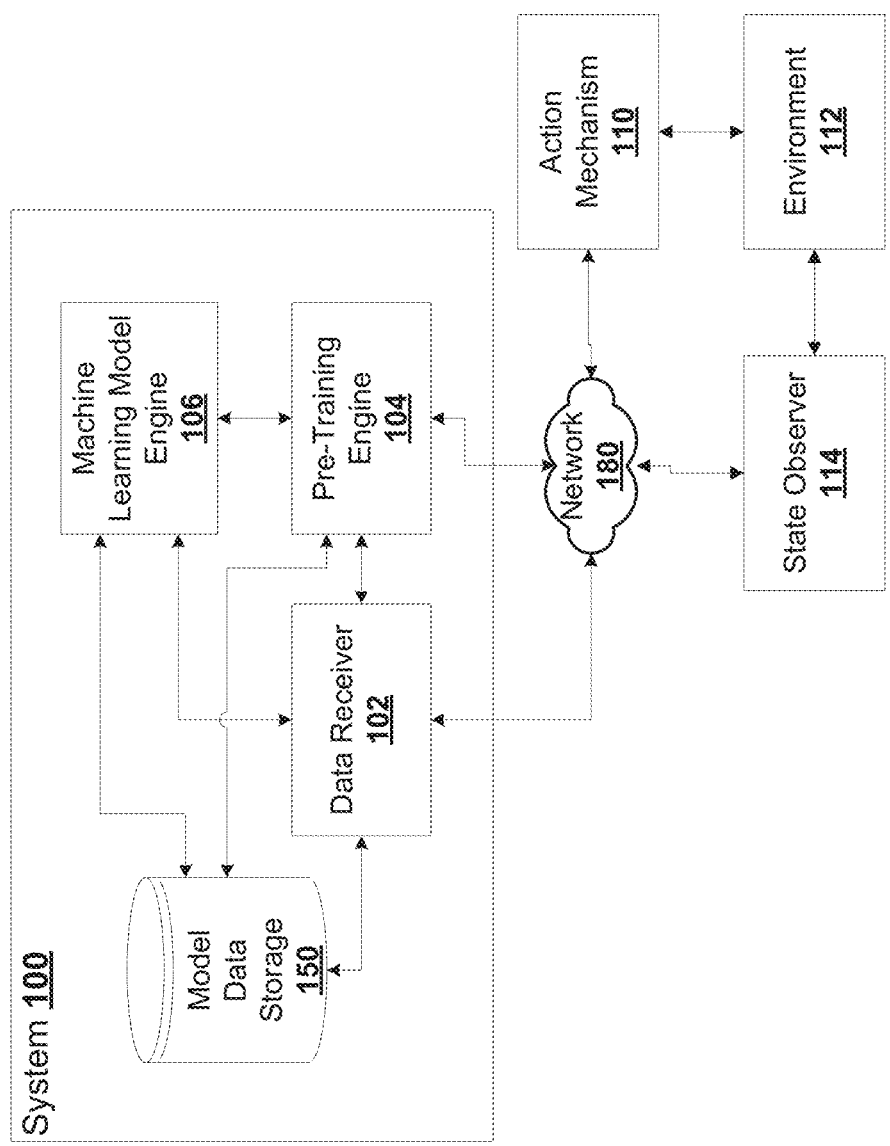
FIG. 4 is a block schematic diagram showing aspects of an example machine learning architecture.

FIG. 4 is a block schematic of an example system 100 for a machine learning architecture. Various embodiments are directed to different implementations of systems described. The system 100 is adapted for machine learning for an environment with multiple agents, for example, multi type mean field Q learning as described herein. In some embodiments, the system includes at least one processor and computer readable memory. In some embodiments, the demonstrations or agent/opponent actions may be performed by a human actor, who may be non-expert, or may be performed by a non-human actor, such as another machine.

System 100 may be a computer server-based system, for example, residing in a data center or a distributed resource "cloud computing" type infrastructure. System 100 may include a computer server having at least one processor and configured for dynamically maintaining a model for conducting the one or more sequential tasks and improving the model over a training period to optimize a performance variable through reinforcement learning on a model data storage 150 (e.g., a database).

In some embodiments, system 100 is adapted for providing a machine learning architecture which can rely on/act based on state(s), and states and/or actions of other agents.

The system 100 is implemented using electronic circuits and computer components, and aspects are adapted to pre-train the machine learning model to improve convergence or accuracy based on the demonstrator data sets.

Observation data can be received in the form of encapsulated data structure elements, for example, as recorded by state observer 114 and/or observed through recorded and processed data sets of the agent associated with action mechanism 110 interacting with an environment 112, and the associated inputs indicative of the actions taken by the agent.

The states of the environment can be observed by a state observer 114, for example, by recording aspects or features of the environment. In some embodiments, the state includes image data of an interface. The states may be associated with different rewards/penalties, for example, such as a time-elapsed in a game (e.g., as extracted through optical character recognition from a time-display element), a score (e.g., as extracted through optical character recognition from a score-display element), trade results and market data, among others.

In another example, if the agent is being used for game playing where there is a clearly defined win/loss condition, the reward may simply be provided tracked as a 1 for a win and a 0 for a loss. Where the states cannot be directly tied to specific win/loss conditions (e.g., in a board-game where the depth required to analyze victory/failure states is too distant), a proxy reward/penalty may be assigned (e.g., based on a positional evaluation or a heuristic).

A data receiver 102 is configured for receiving data sets representative of the monitored demonstrations for performing sequential tasks (e.g., playing games, trading stocks, sorting, association learning, image recognition).

As there may be differences in quality as between demonstrators and their associated demonstrator data sets, as described in various embodiments, these potential contradictions arise in the form of differing actions that are suggested by at least one of the demonstrator data sets (e.g., from a demonstrator), or from the machine learning model itself.

In some embodiments, data receiver 102 receives demonstrator data sets from multiple demonstrator data sources.

In some embodiments, historical observation data is stored in memory and can be used to generate retrospective observation data sets for the current observation time. In some embodiments observation times can be periodic, sporadic, or at any defined, triggered, or random time.

The outputs as provided in the instruction sets may include actions to be executed that impact the environment, and for example, cause state transitions to occur. The observations may be tracked by a state observer, which may, for example, include display signal tap to record interface display aspects, among others.

A machine learning model engine 106 processes received inputs and data sets, and iterates a stored model to update the model over a period of time to generate one or more outputs, which may include instruction sets to be transmitted across network 180 to an action mechanism 110. The model may represent a neural network including a group of nodes interconnected by one or more connections, the group of nodes including at least a subgroup of input nodes, a subgroup of hidden nodes, and a subgroup of output nodes.

A feature extraction mechanism, or a feature extractor, may be provided in the form of a pre-training engine 104 configured for processing the one or more data sets representative of the monitored demonstrations to extract one or more features, the extracted one or more features used to initialize the neural network to reduce an initial exploration rate that would otherwise result in training the neural network.

In some embodiments, engine 104 is configured to provide a contradiction detection engine configured to process the one or more features by communicating the one or more features for processing by the neural network and receiving a signal output from the neural network indicative of the one or more potential contradictions.

These contradictions, for example, may be indicative of "best practices" that are contradictory. A demonstrator data set may indicate that a correct path to dodge a spike is to jump over it, while another data set may indicate that the correct path is to jump into it. Where there is contradictory actions, for example, engine 104 may generate a control signal indicating a specific action to be taken.

As described in various embodiments herein, engine 104 is configured to determine a next action based on the machine learning model stored in model data storage 150 (e.g., a Q-learning policy). In some embodiments, the machine learning model can be based on aspects of a multi-agent mean field reinforcement model as described herein or otherwise.

The pre-training engine 104 is configured to associate one or more weights with one or more data elements of the one or more data sets linked to the one or more contradictions, the one or more weights modifying the processing of the one or more data elements of the one or more data sets when training the machine learning model to improve the model over the training period.

After an action is executed, machine learning engine 106 observes the outcome and associated rewards/states, and updates the machine learning model stored in model data storage 150.

In some embodiments, an optional learning speed monitoring engine 108 may be provided. Engine 108 is configured, in some embodiments to track the progress of the machine learning model in achieving rewards, tracked in an optional training performance storage 152.

Figure 5:
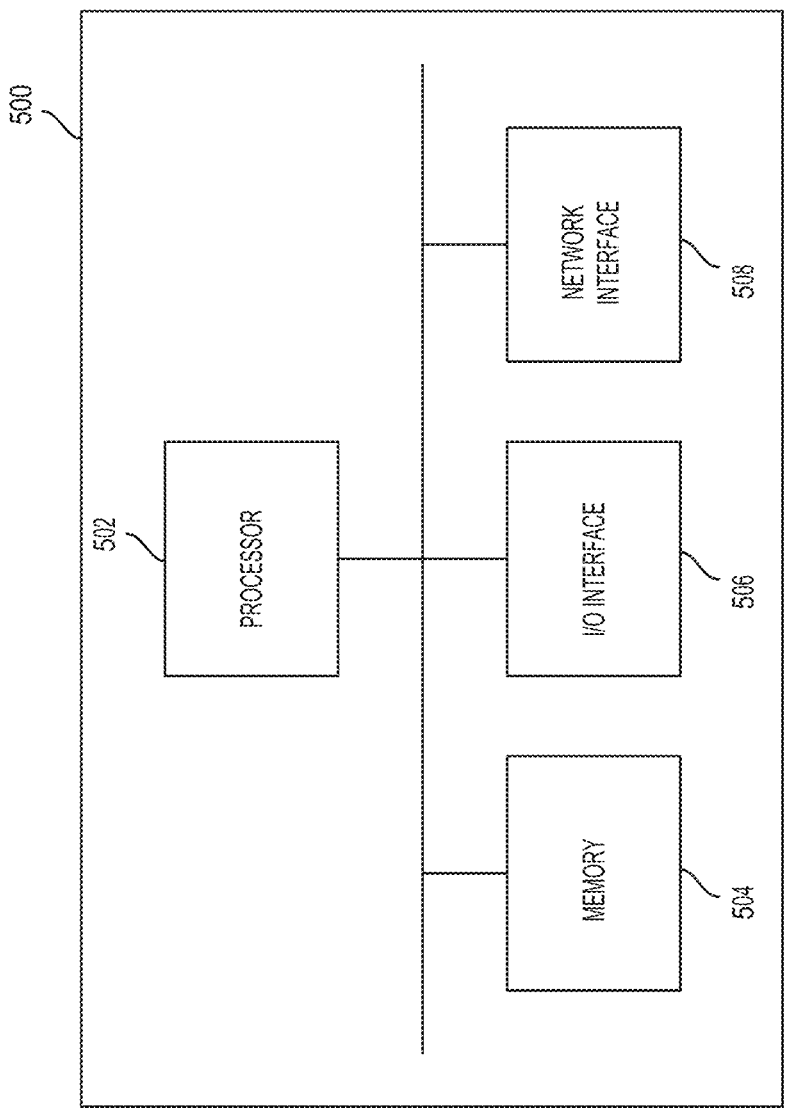
FIG. 5 shows aspects of an example computing system for providing a machine learning architecture.

FIG. 5 is a block schematic diagram of an example computing device, according to some embodiments. There is provided a schematic diagram of computing device 500, exemplary of an embodiment. As depicted, computing device 500 includes at least one processor 502, memory 504, at least one I/O interface 506, and at least one network interface 508. The computing device 500 can be configured as a machine learning server adapted to dynamically maintain one or more neural networks. Embodiments of multi type mean field Q learning, as described herein, may be implemented as software and/or hardware, for example, in a computing device 500 as illustrated in FIG. 5. Similarly, method 600, including one or more of blocks 610 to 650, as described below, may be performed by software and/or hardware of a computing device such as computing device 500.

Each processor 502 may be a microprocessor or microcontroller, a digital signal processing (DSP) processor, an integrated circuit, a field programmable gate array (FPGA), a reconfigurable processor, a programmable read-only memory (PROM), or combinations thereof.

Memory 504 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 506 enables computing device 500 to interconnect with one or more input devices, such as a keyboard, mouse, camera, touch screen and a microphone, or with one or more output devices such as a display screen and a speaker.

Figure 6:
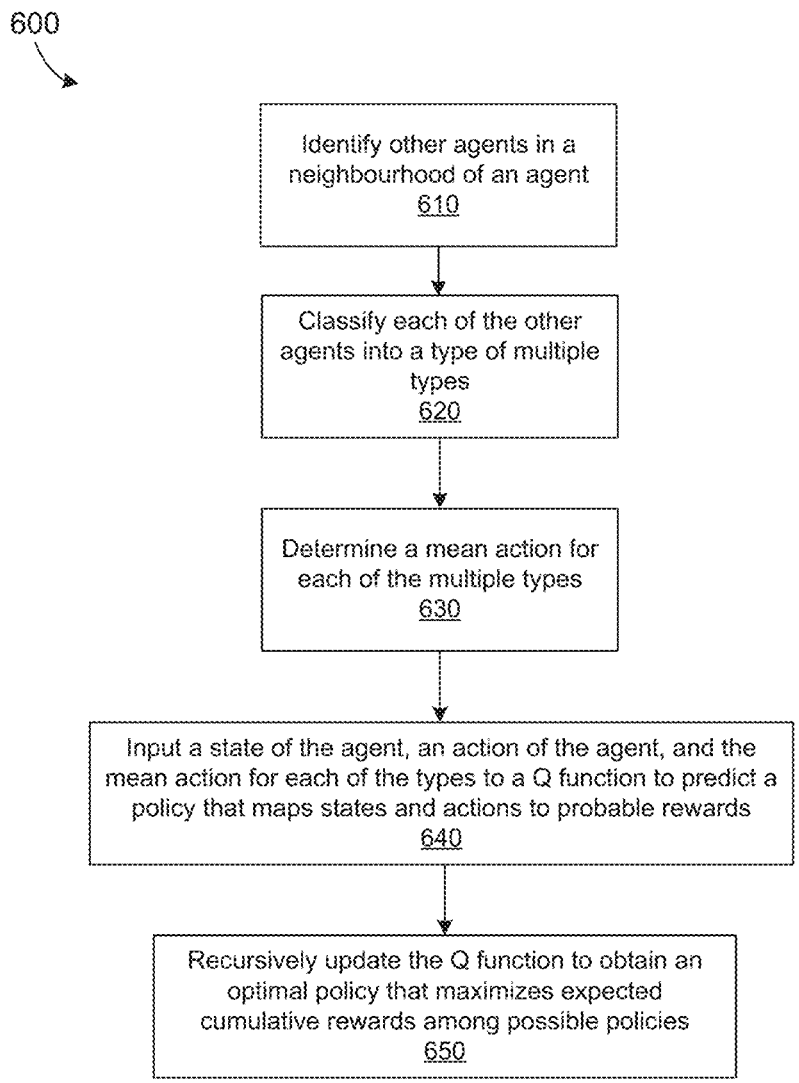
FIG. 6 is a flowchart of a process for multi type mean field Q reinforcement learning, according to an embodiment.

FIG. 6 is a flowchart of a method 600 for multi type mean field Q reinforcement learning, according to an embodiment. The steps are provided for illustrative purposes. Variations of the steps, omission or substitution of various steps, or additional steps may be considered.

At block 610, other agents in a neighbourhood of an agent are identified.

At block 620, each of the other agents is classified into a type of multiple types.

At block 630, a mean action is determined for each of the multiple types.

At block 640, a state of the agent, an action of the agent, and the mean action for each of the types is input to a Q function to predict a policy that maps states and actions to probable rewards.

At block 650, the Q function is recursively updated to obtain an optimal policy that maximizes expected cumulative rewards among possible policies.

It should be understood that one or more of the blocks may be performed in a different sequence or in an interleaved or iterative manner.

The disclosure herein provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

REFERENCES

[1] K. Arulkumaran and M. P. Deisenroth and M. Brundage and A. A. Bharath. Deep Reinforcement Learning: A Brief Survey. IEEE Signal Processing Magazine, 34(6):26-38, 2017.

[2] Bloembergen, Daan and Tuyls, Karl and Hennes, Daniel and Kaisers, Michael. Evolutionary dynamics of multi-agent learning: A survey. *Journal of Artificial Intelligence Research*, 53:659-697, 2015.

[3] Bowling, Michael and Veloso, Manuela. An analysis of stochastic game theory for multiagent reinforcement learning. Technical report, Carnegie-Mellon Univ Pittsburgh Pa. School of Computer Science, 2000.

[4] Bu, Lucian and Babu, Robert and De Schutter, Bart and others. A comprehensive survey of multiagent reinforcement learning. *IEEE Transactions on Systems, Man, and Cybernetics, Part C (Applications and Reviews)*, 38(2):156-172, 2008.

[5] Busoniu, Lucian and Babuska, Robert and De Schutter, Bart. *Multi-agent Reinforcement Learning: An Overview*, volume 310, pages 183-221. Delft University of Technology, 2010.

[6] Hernandez-Leal, Pablo and Kartal, Bilal and Taylor, Matthew E. A survey and critique of multiagent deep reinforcement learning. Autonomous Agents and Multi-Agent Systems, 33(6):750-797, 2019.

[7] Hu, Junling and Wellman, Michael P. Nash Q-learning for general-sum stochastic games. *Journal of machine learning research*, 4(November):1039-1069, 2003.

[8] Jaakkola, Tommi and Jordan, Michael I. and Singh, Satinder P. On the Convergence of Stochastic Iterative Dynamic Programming Algorithms. *Neural Computation*, 6(6):1185-1201, 1994.

[9] Jordan, James S. Bayesian learning in normal form games. *Games and Economic Behavior*, 3(1):60-81, 1991.

[10] Lasry, Jean-Michel and Lions, Pierre-Louis. Mean field games. *Japanese journal of mathematics*, 2(1): 229-260, 2007.

[11] Maskin, Eric. Nash equilibrium and welfare optimality. *The Review of Economic Studies*, 66(1):23-38, 1999.

[12] Mguni, David and Jennings, Joel and de Cote, Enrique Munoz. Decentralised learning in systems with many, many strategic agents. *Thirty-Second AAAI Conference on Artificial Intelligence*, 2018.

[13] Mnih, Volodymyr and Kavukcuoglu, Koray and Silver, David and Rusu, Andrei A and Veness, Joel and Bellemare, Marc G and Graves, Alex and Riedmiller, Martin and Fidjeland, Andreas K and Ostrovski, Georg and others. Human-level control through deep reinforcement learning. *Nature*, 518(7540):529, 2015.

[14] Nguyen, Thanh Thi and Nguyen, Ngoc Duy and Nahavandi, Saeid. Deep reinforcement learning for multi-agent systems: a review of challenges, solutions and applications. *arXiv preprint arXiv:*1812.11794, 2018.

[15] Sutton, Richard S and Barto, Andrew G. *Introduction to reinforcement learning*, volume 135. MIT press Cambridge, 1998.

[16] Tan, Ming. Multi-agent reinforcement learning: Independent vs. cooperative agents. *Proceedings of the tenth international conference on machine learning*, pages 330-337, 1993.

[17] Yang, Yaodong and Luo, Rui and Li, Minne and Zhou, Ming and Zhang, Weinan and Wang, Jun. Mean Field Multi-Agent Reinforcement Learning. In Dy, Jennifer and Krause, Andreas, editors, *Proceedings of the 35th International Conference on Machine Learning* in Proceedings of Machine Learning Research, pages 5571-5580, Stockholm, Stockholm Sweden, 2018. PMLR.

[18] Zheng, Lianmin and Yang, Jiacheng and Cai, Han and Zhou, Ming and Zhang, Weinan and Wang, Jun and Yu, Yong. Magent: A many-agent reinforcement learning platform for artificial collective intelligence. *Thirty-Second AAAI Conference on Artificial Intelligence*, 2018.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer-implemented method for training an agent in a multi-agent environment, the method comprising:
   for an agent of multiple agents in an environment, receiving observation data via a state observer executing on at least one processor, and identifying other agents of the environment in a neighbourhood of the agent, wherein the state observer is configured to observe data from at least one of; an imaging interface, a display signal tap, or a financial data feed;
   classifying each of the other agents into a type of multiple types;
   determining a mean action for each of the multiple types;
   inputting a state of the agent, an action of the agent, and the mean action for each of the types to a machine learning architecture comprising a neural network and instantiating a Q function to predict a policy that maps states and actions to probable rewards;
   training the neural network to facilitate the Q function converging at a policy that maximizes expected cumulative rewards among possible policies; and
   generating control signals for the agent to perform an action in the environment based on the Q function.

2. The computer-implemented method of claim 1, wherein the Q function is based on:

$$Q_{t+1}^j(s,a^j,\bar{a}_1^j,\bar{a}_2^j,\ldots \bar{a}_M^j) = (1-\alpha)Q_t^j(s,a^j,\bar{a}_1^j,\bar{a}_2^j,\ldots \bar{a}_M^j) + \alpha[r^j+\gamma v_t^j(s')]$$

where $a^j$ is an action of agent j, $\bar{a}_i^j$ is a mean action of the neighbours of agent j belonging to type i, $r^j$ is a reward obtained, s and s' are old and new states respectively, $a_r$ is a learning rate, and $v_t^j(s')$ is a value function for agent j at time t.

3. The computer-implemented method of claim 2, wherein the value function $v_t^j(s')$ for agent j at time t is given by:

$$v_t^j(s') = \sum_{a^j} \pi_t^j(a^j|s',\bar{a}_1^j,\ldots \bar{a}_M^j)\mathbb{E}_{a_i^{-j}\sim\pi_t^{-j}}[Q_t^j[s',a^j,\bar{a}_1^j,\ldots \bar{a}_M^j]].$$

4. The computer-implemented method of claim 3, wherein the mean actions of the neighbours of agent j belonging to type i are calculated using the relation:

$$\bar{a}_i^j = \frac{1}{N_i^j}\sum_k a_i^k, a_i^k \sim \pi_t^k(\cdot|s,\bar{a}_{1-}^k,\ldots,\bar{a}_{M-}^k)$$

where $\pi_t^k$ is a policy of agent k belonging to type i and $\bar{a}_{i-}^k$ represents a previous mean action for the neighbours of agent k belonging to type i.

5. The computer-implemented method of claim 4, wherein a Boltzmann policy for each agent j is $$\pi_t^j(a^j|s,\bar{a}_1^j,\ldots \bar{a}_M^j) = \frac{\exp(\beta Q_t^j(s,a^j,\bar{a}_1^j,\ldots,\bar{a}_M^j))}{\sum_{a^{j'}\in A^j}\exp(\beta Q_t^j(s,a^{j'},\bar{a}_1^j,\ldots \bar{a}_M^j))}.$$

6. The computer-implemented method of claim 1, wherein the type of each of the other agents is defined.

7. The computer-implemented method of claim 1, wherein the type of each of the other agents is initially unknown.

8. The computer-implemented method of claim 7, further comprising performing k-means clustering to approximate a type for the initially unknown types.

9. The computer-implemented method of claim 1, wherein the training is performed to converge to a fixed point within a bounded distance of a Nash equilibrium.

10. A non-transitory computer readable medium comprising a computer readable memory storing computer executable instructions thereon that when executed by a computer cause the computer to perform the method of claim 1.

11. A system for a machine reinforcement learning architecture for controlling an agent in an environment with a plurality of agents, the system comprising:
   at least one memory and at least one processor configured to provide a multi-agent reinforcement learning architecture comprising a set of interconnected nodes instantiating a recursively-updated Q function including multiple types of agents, wherein each type of agent has a corresponding mean action; and wherein upon receiving input data sets, the at least one processor iteratively updates the set of nodes;
   wherein based on received observation data, the at least one processor is configured to generate controls signals for the agent to perform an action in the environment based on the recursively-updated Q function, the observation data received from a state observer executing on at least one process; wherein the state observer is configured to observe data from at least one of: an imaging interface, a display signal tap, or a financial data feed.

12. The system of claim 11, wherein the at least one processor is further configured to train the agent to maximize expected cumulative rewards using the multi-agent reinforcement learning architecture.

13. The system of claim 11, wherein the Q function is based on:

$$Q_{t+1}^j(s,a^j,\bar{a}_1^j,\bar{a}_2^j,\ldots \bar{a}_M^j)=(1-\alpha)Q_t^j(s,a^j,\bar{a}_1^j,\bar{a}_2^j,\ldots \bar{a}_M^j)+\alpha[r^j+\gamma v_t^j(s')]$$

where $a^j$ is an action of agent j, $\bar{a}_i^j$ is a mean action of the neighbours of agent j belonging to type i, $r^j$ is a reward obtained, s and s' are old and new states respectively, $a_t$ is a learning rate, and $v_t^j(s')$ is a value function for agent j at time t.

14. The system of claim 13, wherein the value function $v_t^j(s')$ for agent j at time t is given by:

$$v_t^j(s') = \sum_{a^j} \pi_t^j(a^j|s',\bar{a}_1^j,\ldots \bar{a}_M^j)\mathbb{E}_{a_i^{-j}\sim\pi_t^{-j}}[Q_t^j[s',a^j,\bar{a}_1^j,\ldots \bar{a}_M^j]].$$

15. The system of claim 14, wherein the mean actions of the neighbours of agent j belonging to type i are calculated using the relation:

$$\bar{a}_i^j = \frac{1}{N_i^j}\sum_k a_i^k, a_i^k \sim \pi_t^k(\cdot|s,\bar{a}_{1-}^k,\ldots,\bar{a}_{M-}^k)$$

where $\pi_t^k$ is a policy of agent k belonging to type i and $\bar{a}_{i-}^k$ represents a previous mean action for the neighbours of agent k belonging to type i.

16. The system of claim 15, wherein a Boltzmann policy for each agent j is $$\pi_t^j(a^j|s,\bar{a}_1^j,\ldots \bar{a}_M^j) = \frac{\exp(\beta Q_t^j(s,a^j,\bar{a}_1^j,\ldots,\bar{a}_M^j))}{\sum_{a^{j'}\in A^j}\exp(\beta Q_t^j(s,a^{j'},\bar{a}_1^j,\ldots \bar{a}_M^j))}.$$

17. The system of claim 11, wherein the multiple types of agents are defined.

18. The system of claim 11, wherein the multiple types of agents are initially unknown.

19. The system of claim 11, wherein the at least one processor is further configured to perform k-means clustering to approximate a type for the initially unknown types.

20. The system of claim 11, wherein the Q function is recursively-updated to converge to a fixed point within a bounded distance of a Nash equilibrium.

21. The method of claim 1 wherein the environment is an electronic environment in which the multiple agents are interacting, and wherein the control signals cause the agent to perform the action in the electronic environment based on the Q function and the observation data from observations of the electronic environment.

* * * * *